US010740016B2

(12) United States Patent
White et al.

(10) Patent No.: US 10,740,016 B2
(45) Date of Patent: Aug. 11, 2020

(54) MANAGEMENT OF BLOCK STORAGE DEVICES BASED ON ACCESS FREQUENCY WHEREIN MIGRATION OF BLOCK IS BASED ON MAXIMUM AND MINIMUM HEAT VALUES OF DATA STRUCTURE THAT MAPS HEAT VALUES TO BLOCK IDENTIFIERS, SAID BLOCK IDENTIFIERS ARE ALSO MAPPED TO SAID HEAT VALUES IN FIRST DATA STRUCTURE

(71) Applicant: Scale Computing, Inc., Indianapolis, IN (US)

(72) Inventors: Philip Andrew White, Renton, WA (US); Hank T. Hsieh, San Francisco, CA (US); Scott Loughmiller, San Francisco, CA (US); Asad Ahmad Saeed, Emeryville, CA (US); Sumner Augustine St. Clair, Oakland, CA (US)

( * ) Notice: Subject to any disclaimer, the term of this patent is extended or adjusted under 35 U.S.C. 154(b) by 149 days.

(21) Appl. No.: 15/349,961

(22) Filed: Nov. 11, 2016

(65) Prior Publication Data

US 2018/0136838 A1   May 17, 2018

(51) Int. Cl.
*G06F 3/06* (2006.01)

(52) U.S. Cl.
CPC ............ *G06F 3/0647* (2013.01); *G06F 3/061* (2013.01); *G06F 3/0665* (2013.01); *G06F 3/0685* (2013.01)

(58) Field of Classification Search
None
See application file for complete search history.

(56) References Cited

U.S. PATENT DOCUMENTS

| 6,658,533 | B1* | 12/2003 | Bogin | G06F 12/0804 711/133 |
| 8,429,346 | B1* | 4/2013 | Chen | G06F 3/0613 709/213 |
| 8,583,838 | B1* | 11/2013 | Marshak | G06F 3/061 710/16 |
| 8,688,904 | B1* | 4/2014 | Ari | G06F 3/0611 711/100 |
| 9,274,941 | B1* | 3/2016 | Throop | G06F 12/023 |
| 9,519,438 | B1* | 12/2016 | Chatterjee | G06F 3/0604 |
| 9,747,036 | B2* | 8/2017 | Maki | G06F 3/0611 |
| 9,898,224 | B1* | 2/2018 | Marshak | G06F 3/0604 |
| 2008/0066066 | A1* | 3/2008 | MacPherson | G06F 9/5027 718/100 |
| 2008/0291934 | A1* | 11/2008 | Christenson | H04L 47/10 370/412 |

(Continued)

*Primary Examiner* — William B Partridge
*Assistant Examiner* — Chie Yew
(74) *Attorney, Agent, or Firm* — Leydig, Voit & Mayer, Ltd.

(57) ABSTRACT

A system, method, and computer program product are provided for allocating blocks of memory in a virtual storage device based on access frequency. The method includes the steps of tracking access frequency for a plurality of blocks of memory in a virtual storage device utilizing a heat map and reallocating the plurality of blocks of memory in the virtual storage device among a plurality of blocks of memory in two or more real storage devices based on the heat map. The heat map includes at least one data structure that maps block identifiers corresponding to the plurality of blocks of memory in the virtual storage device to heat values that represent the access frequency of a corresponding block of memory.

20 Claims, 14 Drawing Sheets

(56) References Cited

U.S. PATENT DOCUMENTS

| | | | |
|---|---|---|---|
| 2009/0019239 A1* | 1/2009 | Allison | G06F 13/1642 |
| | | | 711/151 |
| 2010/0274826 A1* | 10/2010 | Takata | G06F 3/0605 |
| | | | 707/812 |
| 2013/0054920 A1* | 2/2013 | Sato | G06F 3/0605 |
| | | | 711/165 |
| 2014/0095450 A1* | 4/2014 | Marwah | G06F 17/30073 |
| | | | 707/668 |
| 2016/0342364 A1* | 11/2016 | Ono | G06F 12/00 |
| 2018/0129424 A1* | 5/2018 | Confalonieri | G06F 3/0611 |

* cited by examiner

Heat Map 600

List 601

BlockID → Heat

List 602

Heat → BlockID(s)

FIFO 603

*Fig. 6*

Heat Map 700

List 701(0)

BlockID → Heat

List 702(0)

Heat → BlockID(s)

List 701(1)

BlockID → Heat

List 702(1)

Heat → BlockID(s)

FIFO 703

*Fig. 7B*

MANAGEMENT OF BLOCK STORAGE DEVICES BASED ON ACCESS FREQUENCY WHEREIN MIGRATION OF BLOCK IS BASED ON MAXIMUM AND MINIMUM HEAT VALUES OF DATA STRUCTURE THAT MAPS HEAT VALUES TO BLOCK IDENTIFIERS, SAID BLOCK IDENTIFIERS ARE ALSO MAPPED TO SAID HEAT VALUES IN FIRST DATA STRUCTURE

FIELD OF THE INVENTION

The present invention relates to storage systems, and more particularly to a technique for managing allocation of block storage devices.

BACKGROUND

Many modern computing systems may implement virtualization of system resources for emulating a set of hardware resources configured to execute various processes. For example, a blade server may execute a hypervisor or virtual machine monitor that manages a plurality of virtual machines within a system. Each virtual machine may emulate a different set of hardware resources that may or may not be similar to the hardware resources of the server.

Some systems may include a resource that is implemented as a block device. A block device includes a number of blocks of non-volatile memory. Hard disk drives, optical drives, and solid state drives are all examples of hardware devices that can be implemented as a block device. Many systems may include a plurality of block devices for storing programs and/or data. These block devices do not necessarily have to be the same underlying technology. For example, some block devices may be conventional magnetic hard disk drives while other block devices may be solid state drives. Each of these devices may have different characteristics of operation. For example, one device may be faster than another device. When space is allocated in different devices, certain data may be stored on one device whereas other data is stored on another device. If the data stored on a slower device is accessed much more frequently than the data stored on a faster device, then the operation of the computer system may be inefficient. Thus, there is a need for addressing this issue and/or other issues associated with the prior art.

SUMMARY

A system, method, and computer program product are provided for allocating blocks of memory in a virtual storage device based on access frequency. The method includes the steps of tracking access frequency for a plurality of blocks of memory in a virtual storage device utilizing a heat map and reallocating the plurality of blocks of memory in the virtual storage device among a plurality of blocks of memory in two or more real storage devices based on the heat map. The heat map includes at least one data structure that maps block identifiers corresponding to the plurality of blocks of memory in the virtual storage device to heat values that represent the access frequency of a corresponding block of memory.

BRIEF DESCRIPTION OF THE DRAWINGS

FIG. 6 illustrates a heat map for tracking the access frequency of blocks of memory in a virtual storage device, in accordance with one embodiment;

FIG. 7B illustrates a heat map for tracking the access frequency of blocks of memory in a VSD, in accordance with another embodiment;

DETAILED DESCRIPTION

Virtual resources such as a virtual storage device may be implemented on particular nodes of a system that includes a plurality of nodes. Data stored in the blocks of memory in the virtual storage device(s) may be stored on various real storage devices such as hard disk drives, optical drives, or solid state drives. The data stored on these real storage devices may be accessed by the programs being executed within the nodes using virtual memory addresses to refer to the blocks of memory in the virtual storage device(s).

The technology on which the real storage devices are based may be mixed. An array of hard disk drives may be utilized to provide a bulk of the storage attached to a node. Hard disk drives are relatively inexpensive, but these devices may be slow to access and have a potential for errors due to their mechanical nature. In contrast, solid state drives are relatively fast to access and are more reliable than conventional hard disk drives, but these devices may be more expensive. Some systems may include a mix of slower hard disk drives and faster solid state drives as well as other storage technology.

In such systems that include different types of storage, blocks of memory in a virtual storage device may be allocated based on a tiered storage system. A first tier may include fast storage devices such as solid state drives. A second tier may include slower storage devices such as hard disk drives. Additional tiers may also be implemented, such as a third tier that includes backup storage devices such as optical drives (CD-RW drives) or magnetic tape devices. In general, each tier may hold storage devices capable of meeting different levels of performance, and a particular type of technology is not limited to being classified within a particular tier. For example, SSD drives may be included in the second tier and a different storage technology, such as 3D XPoint™ technology, may be included in the first tier. In addition, the same types of devices may be classified in different tiers, such as having a first SSD included in the first tier and a second SSD included in a second tier. The allocation of these resources may be managed dynamically to ensure that blocks of memory that are accessed the most frequently are migrated onto the first tier of storage and blocks of memory that are accessed less frequently are migrated onto the second tier (or third tier) of storage. The efficiency of the system can be improved by ensuring that the most frequently accessed blocks of memory are located on the fastest storage devices to reduce the time programs are stalled waiting for data to be returned from the storage devices.

Figure 1:
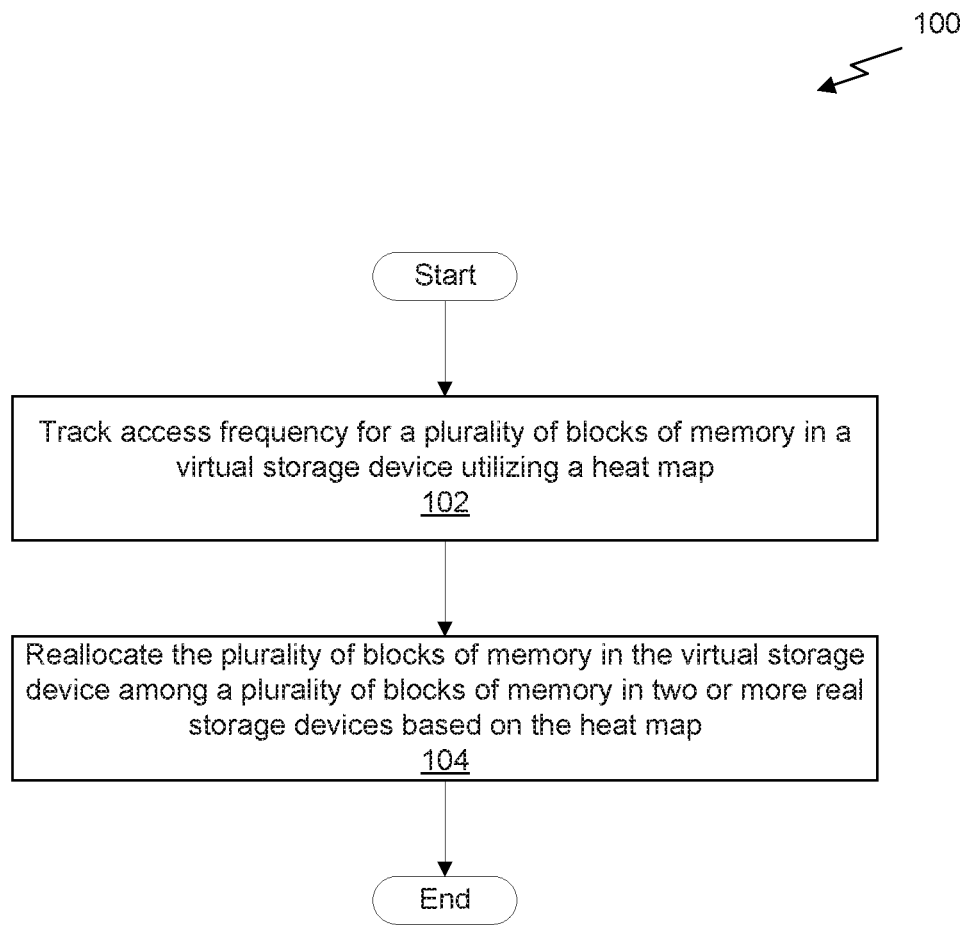
FIG. 1 illustrates a flowchart of a method for allocating blocks of memory in a virtual storage device based on access frequency, according to one embodiment.

FIG. 1 illustrates a flowchart of a method 100 for allocating blocks of memory in a virtual storage device based on access frequency, according to one embodiment. Although the method 100 is described in the context of a program executed by a processor, the method 100 may also be performed by custom circuitry or by a combination of custom circuitry and a program. At step 102, access frequency is tracked for a plurality of blocks of memory in a virtual storage device utilizing a heat map. In one embodiment, a heat map is a software construct that maps block identifiers corresponding to the plurality of blocks of memory to heat values that represent the access frequency of the blocks of memory. The heat map may include a first set of data structures for mapping block identifiers associated with a first tier of real storage devices to corresponding heat values, a second set of data structures for mapping block identifiers associated with a second tier of real storage devices to corresponding heat values, and a third set of data structures for tracking a history of memory access requests. In some embodiments, the heat map may also include additional sets of data structures for mapping block identifiers associated with more tiers of real storage devices to corresponding heat values.

In one embodiment, tracking the access frequency for the plurality of blocks of memory in the virtual storage device utilizing the heat map may be performed by: (1) receiving a memory access request that includes a virtual memory address; (2) processing the memory access request; and (3) updating a heat value associated with a block identifier for a block of memory specified by the virtual memory address in the heat map. The memory access request may include a read request or a write request. Processing the memory access request may include converting the virtual memory address to a memory address in a real storage device and transmitting the memory access request to the real storage device over an interface. Updating the heat value may include incrementing the heat value by one or adding a new entry to the heat map that maps the block identifier to an initial heat value. The initial heat value may be selected based on a tier associated with the block of memory.

In one embodiment, each set of data structures associated with a particular tier of real storage devices includes a first data structure that maps block identifiers to heat values and a second data structure that maps heat values to sets of one or more block identifiers. Each block identifier may comprise a base address in a virtual address space that specifies a particular block of memory in a virtual storage device. In one embodiment, the first data structure and second data structure may be sorted. For example, the first data structure may be sorted based on the block identifiers, and the second data structure may be sorted based on the heat values.

At step 104, the plurality of blocks of memory in the virtual storage device are reallocated among a plurality of blocks of memory in two or more real storage devices based on the heat map. The heat values associated with each block of allocated memory in the virtual storage device may be analyzed to determine an optimal allocation of the plurality of blocks of memory in the virtual storage device among the plurality of blocks of memory in the two or more real storage devices. In one embodiment, a minimum and maximum heat value is determined for each tier of real storage devices. A delta heat value may be calculated by subtracting a minimum heat value associated with a first tier of real storage devices from a maximum heat value associated with a second tier of real storage devices. In one embodiment, the reallocation of the plurality of blocks of memory is triggered based on a comparison of the delta heat value with a trigger value.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
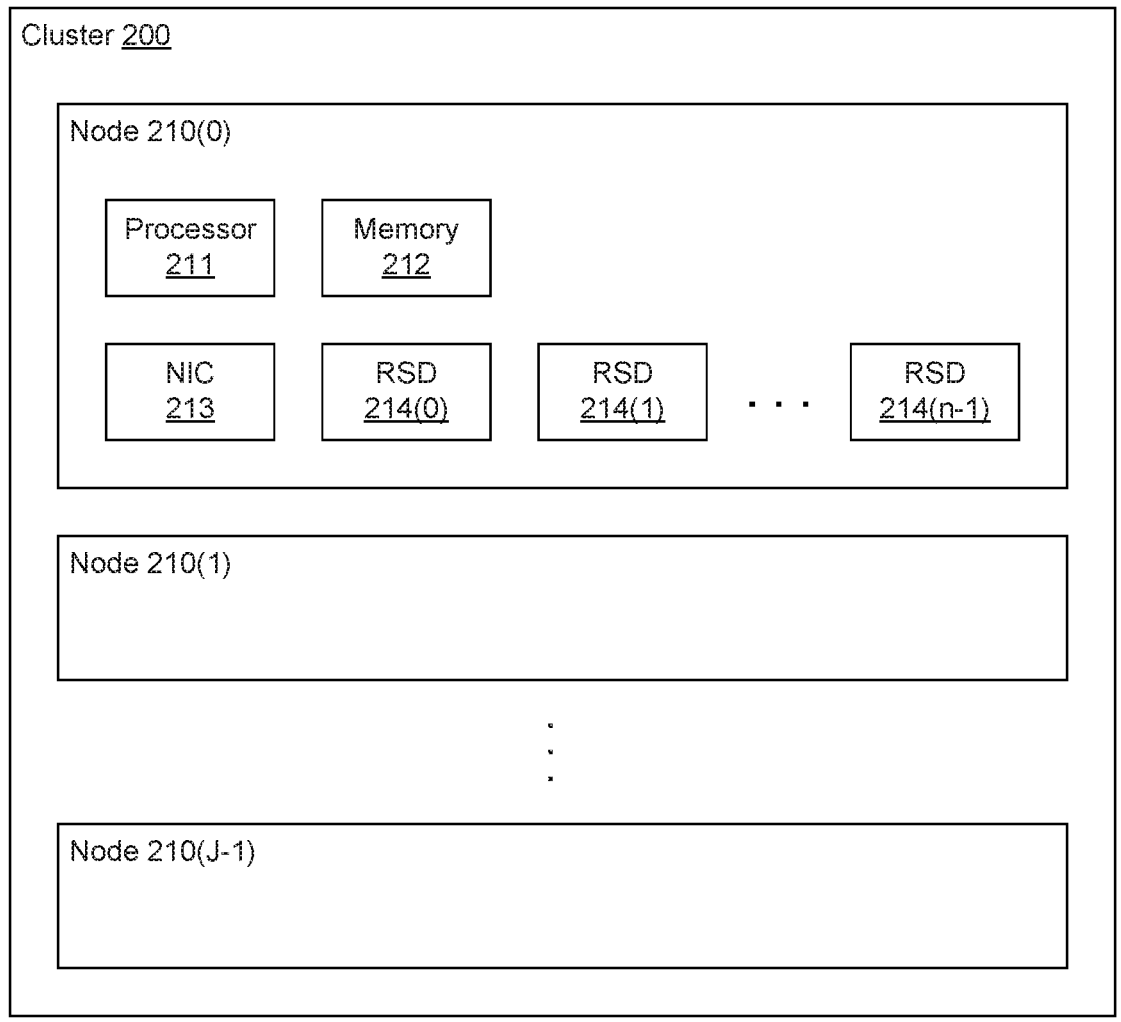
FIG. 2 illustrates a cluster having a plurality of nodes, in accordance with one embodiment.

FIG. 2 illustrates a cluster 200 having a plurality of nodes 210, in accordance with one embodiment. As shown in FIG. 2, the cluster 200 includes, J nodes (i.e., node 210(0), node 210(1), . . . node 210(J−1)). Each node 210 includes a processor 211, a memory 212, a NIC 213, and one or more real storage devices (RSD) 214. The processor 211 may be an x86-based processor, a RISC-based processor, or the like. The memory 212 may be a volatile memory such as a Synchronous Dynamic Random-Access Memory (SDRAM) or the like. The NIC 213 may implement a physical layer and media access control (MAC) protocol layer for a network interface. The physical layer may correspond to various physical network interfaces such as IEEE (Institute of Electrical and Electronics Engineers) 802.3 (Ethernet), IEEE 802.11 (WiFi), and the like. In one embodiment, the memory 212 includes a host operating system kernel, one or more device drivers, one or more applications, and the like. The host operating system kernel may be, e.g., based on the Linux® kernel such as the Red Hat® Enterprise Linux (RHEL) distribution. It will be appreciated that, although not explicitly shown, each node 210 may include one or more other devices such as GPUs, additional microprocessors, displays, radios, or the like.

As used herein an RSD 214 is a physical, non-volatile memory device such as a HDD, an optical disk drive, a solid state drive, a magnetic tape drive, and the like that is capable of storing data. The one or more RSDs 214 may be accessed via an asynchronous input/output functionality implemented by a standard library of the host operating system or accessed via a non-standard library that is loaded by the operating system, in lieu of or in addition to the standard library. In one embodiment, the host operating system may mount the RSDs 214 and enable block device drivers to access the RSDs 214 for read and write access.

The RSDs 214 may implement a file system including, but not limited to, the FAT32 (File Allocation Table-32-bit) file system, NTFS (New Technology File System), or the ext2 (extended file system 2). In one embodiment, each RSD 214 may implement logical block addressing (LBA). LBA is an abstraction layer that maps blocks of the disk (e.g., 512B blocks of a hard disk) to a single unified address. The unified address may be 28-bit, 48-bit, or 64-bit wide that can be mapped, e.g., to a particular cylinder/head/sector tuple of a conventional HDD or other data storage space.

The memory 212 may also include a hypervisor that performs hardware virtualization. In one embodiment, QEMU (Quick EMUlator) is provided for emulating one or more VMs on each node of the cluster 200. In such embodiments, each node 210 may be configured to load a host operating system such as RHEL into the memory 212 on boot. Once the host operating system is running, the QEMU software is launched in order to instantiate one or more VMs on the node 210, each VM implementing a guest operating system that may or may not be the same as the host operating system. It will be appreciated that QEMU may generate VMs that can emulate a variety of different hardware architectures such as x86, PowerPC, SPARC, and the like.

Figure 3A:
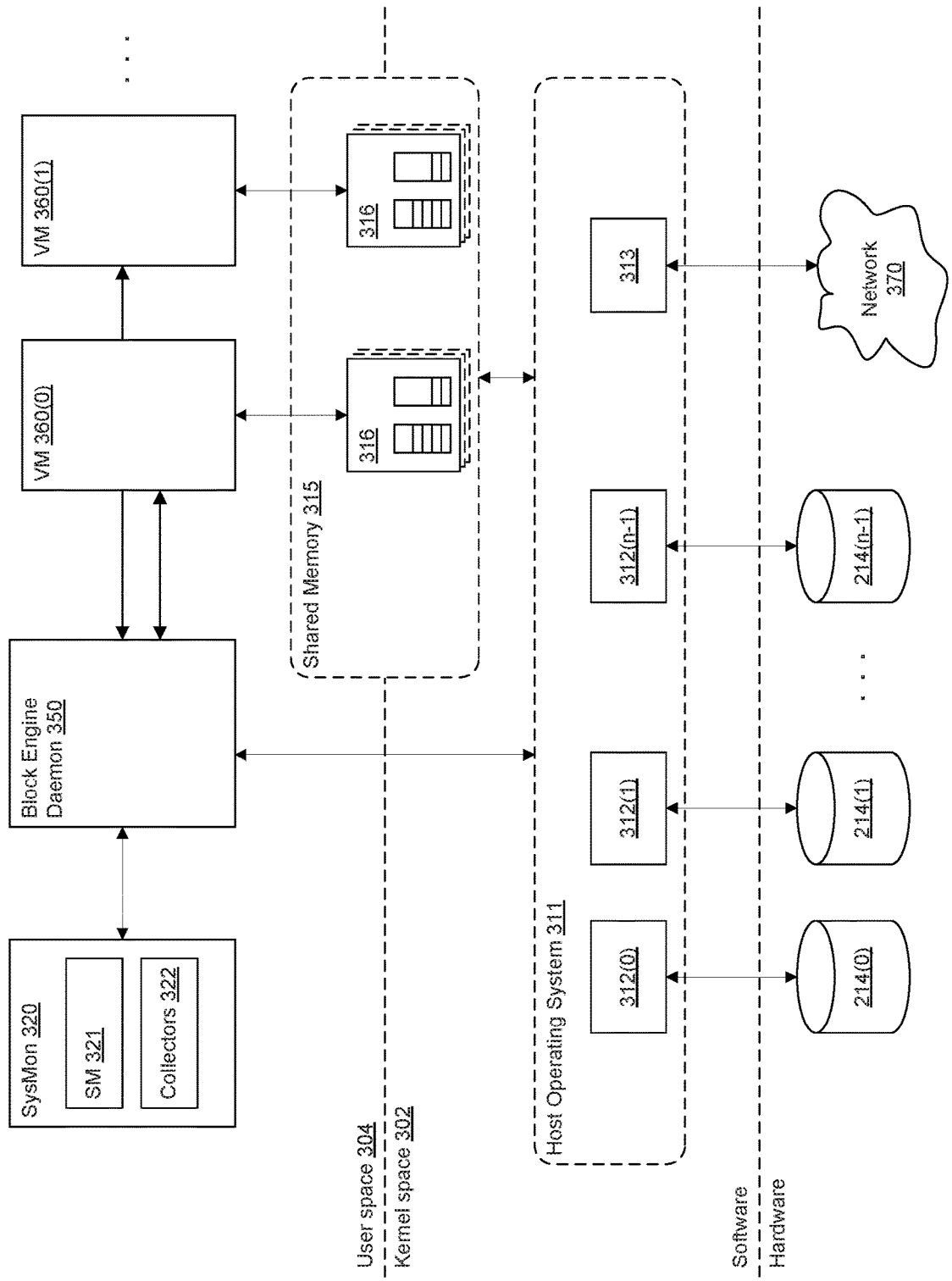
FIGS. 3A & 3B are conceptual diagrams of the architecture for a node of FIG. 2, in accordance with one embodiment.
Figure 3B:
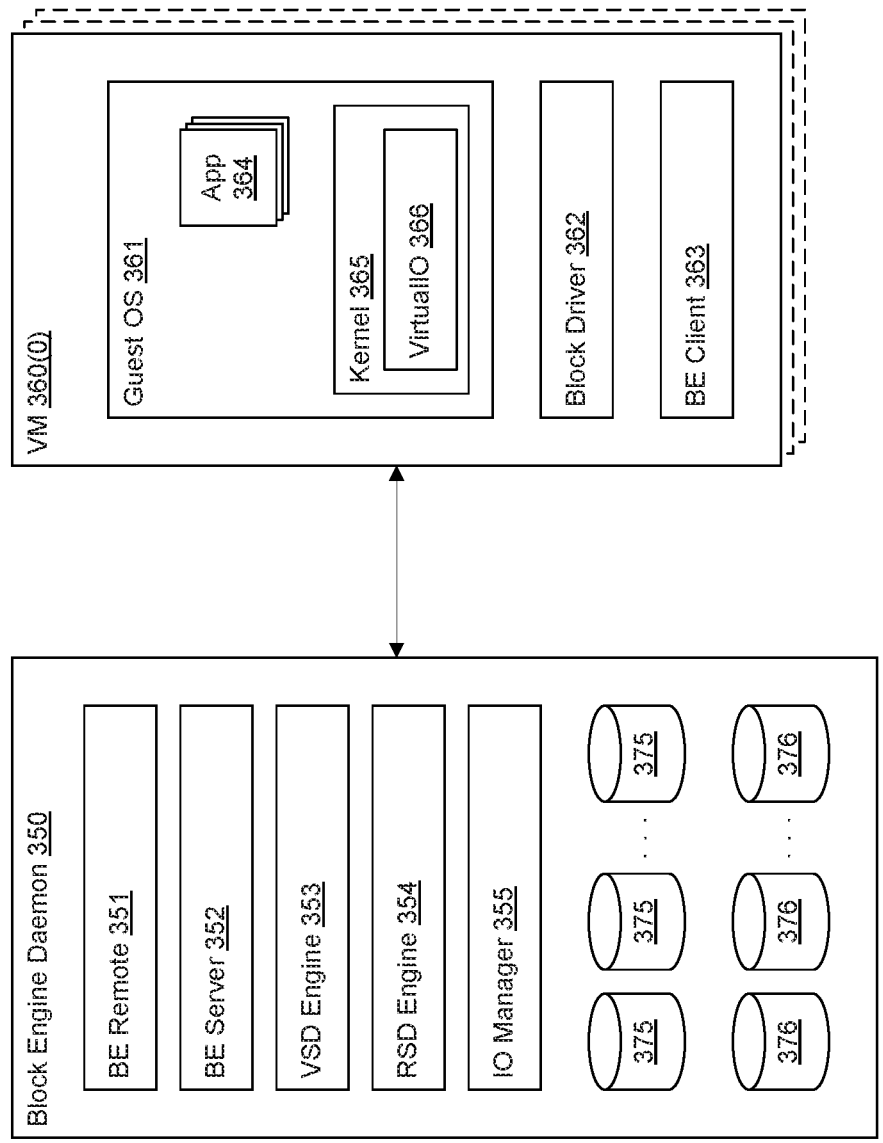

FIGS. 3A & 3B are conceptual diagrams of the architecture for a node 210 of FIG. 2, in accordance with one embodiment. As shown in FIG. 3A, the node 210 may execute a host operating system 311 that implements a protected mode of operation having at least two privilege levels including a kernel space 302 and a user space 304. For example, the host operating system 311 may comprise the Linux® kernel as well as one or more device drivers 312 and 313 that execute in the kernel space 302. The device drivers 312 enable applications in the user space 304 to read or write data from/to the RSDs 214 via a physical interface such as SATA (serial ATA), SCSI (Small Computer System Interface), FC (Fibre Channel), and the like. In one embodiment, the device drivers 312 are generic block device drivers included in the host operating system 311. The device driver 313 enables applications to communicate with other nodes 210 in the cluster 200 via a network interface, which may be wired (e.g., SONET/SDH, IEEE 802.3, etc.) or wireless (e.g., IEEE 802.11, etc.). In one embodiment, the device driver 313 is a generic network driver included in the host operating system 311. It will be appreciated that other device drivers, not explicitly shown, may be included in the host operating system 311, such as device drivers for input devices (e.g., mice, keyboards, etc.), output devices (e.g., monitors, printers, etc.), as well as any other type of hardware coupled to the processor 211.

The conceptual diagram in FIG. 3A shows the RSDs 214 and network 370 within the hardware abstraction layer. In other words, the RSDs 214 and network 370 comprise physical devices having a physical interface to the processor 211 in the node 210, either directly or indirectly through a system bus or bridge device. FIG. 3A also illustrates a software abstraction layer that includes objects and processes resident in the memory 212 of the node 210. The processes may be executed by the processor 211. For example, the host operating system 311, system monitor (SysMon) 320, Block Engine (BE) Daemon 350, and virtual machines (VMs) 360 are processes that are executed by the processor 211.

In one embodiment, the host operating system 311 may allocate a portion of the memory 212 as a shared memory 315 that is accessible by the one or more VMs 360. The VMs 360 may share data in the shared memory 315. The host operating system 311 may execute one or more processes configured to implement portions of the architecture for a node 210. For example, the host operating system 311 executes the BE Daemon 350 in the user space 304. The BE Daemon 350 is a background process that performs tasks related to the block devices coupled to the node 210 (i.e., the RSDs 214). The SysMon 320 implements a state machine (SM) 321 and a set of collectors 322 for managing the instantiation and execution of one or more VMs 360 that are executed in the user space 304. In addition, the SysMon 320 may be configured to manage the provisioning of virtual storage devices (VSDs). VSDs may be mounted to the VMs 360 to provide applications running on the VMs 360 access to the RSDs 214 even though the applications executed by the VMs 360 cannot access the RSDs 214 directly. In one embodiment, the SysMon 320 creates I/O buffers 316 in the shared memory 315 that enable the VMs 360 to read data from or write data to the VSDs mounted to the VM 360. Each VM 360 may be associated with multiple I/O buffers 316 in the shared memory 315. For example, each VSD mounted to the VM 360 may be associated with an input buffer and an output buffer, and multiple VSDs may be mounted to each VM 360.

As shown in FIG. 3B, each instance of the VM 360 implements a guest operating system 361, a block device driver 362, and a block engine client 363. The guest OS 361 may be the same as or different from the host operating system 311. The guest OS 361 comprises a kernel 365 that implements a virtual I/O driver 366 that is logically coupled to a VSD. Each VSD is a logical storage device that maps non-contiguous blocks of storage in one or more RSDs 214 to a contiguous, logical address space of the VSD. The VSD logically appears and operates like a real device coupled to a physical interface for the guest OS 361, but is actually an abstraction layer between the guest OS 361 and the physical storage blocks on the RSDs 214 coupled to the node 210, either directly or indirectly via the network 370. The guest OS 361 may execute one or more applications 364 that can read and write data to the VSD via the virtual I/O driver 366. In some embodiments, two or more VSDs may be associated with a single VM 360.

The block device driver 362 and the BE client 363 implement a logical interface between the guest OS 361 and the VSD. In one embodiment, the block device driver 362 receives read and write requests from the virtual I/O driver 366 of the guest OS 361. The block device driver 362 is configured to write data to and read data from the corresponding I/O buffers 316 in the shared memory 315. The BE client 363 is configured to communicate with the BE server 352 in the BE Daemon 350 to schedule I/O requests for the VSDs.

The BE Daemon 350 implements a Block Engine Remote Protocol 351, a Block Engine Server 352, a VSD Engine 353, an RSD Engine 354, and an I/O Manager 355. The Block Engine Remote Protocol 351 provides access to remote RSDs 214 coupled to other nodes 210 in the cluster 200 via the network 370. The BE Server 352 communicates with one or more BE Clients 363 included in the VMs 360. Again, the BE Client 363 generates I/O requests related to one or more VSDs for the BE Server 352, which then manages the execution of those requests. The VSD Engine 353 enables the BE Server 352 to generate tasks for each of the VSDs. The RSD Engine 354 enables the VSD Engine 353 to generate tasks for each of the RSDs 214 associated with the VSDs. The RSD Engine 354 may generate tasks for local RSDs 214 utilizing the I/O Manager 355 or remote RSDs 214 utilizing the BE Remote Protocol 351. The I/O Manager 355 enables the BE Daemon 350 to generate asynchronous I/O operations that are handled by the host OS 311 to read from or write data to the RSDs 214 connected to the node 210. Functions implemented by the I/O Manager 355 enable the BE Daemon 350 to schedule I/O requests for one or more VMs 360 in an efficient manner. The BE Server 352, VSD Engine 353, RSD Engine 354, I/O Manager 355 and BE Remote Protocol 351 are implemented as a protocol stack.

In one embodiment, the VSD Engine 353 maintains state and metadata associated with a plurality of VSD objects 375. Each VSD object 375 may include a mapping table that associates each block of addresses (i.e., an address range) in the VSD with a corresponding block of addresses in one or more RSDs 214. The VSD Engine 353 may maintain various state associated with a VSD such as a VSD identifier (i.e., handle), a base address of the VSD object 375 in the memory 212, a size of the VSD, a format of the VSD (e.g., filesystem, block size, etc.), and the like.

Similarly, the RSD Engine 354 maintains state and metadata associated with a plurality of RSD objects 376. Each RSD object 376 may correspond to an RSD 214 connected to the node 210 or an RSD 214 accessible on another node 210 via the network 370. The RSD Engine 354 may maintain various state associated with each RSD 214 such as an RSD identifier (i.e., handle), a base address of the RSD object 376 in the memory 212, a size of the RSD 214, a format of the RSD 214 (e.g., filesystem, block size, etc.), and the like. The RSD Engine 354 may also track errors associated with each RSD 214.

The VSD objects 375 and the RSD objects 376 are abstraction layers implemented by the VSD Engine 353 and RSD Engine 354, respectively, that enable VMs 360, via the BE Daemon 350, to store data on the RSDs 214. In one embodiment, the VSD abstraction layer is a set of objects defined using an object-oriented programming (OOP) language. As used herein, an object is an instantiation of a class and comprises a data structure in memory that includes fields and pointers to methods implemented by the class. The VSD abstraction layer defines a VSD class that implements a common interface for all VSD objects 375 that includes the following methods: Create; Open; Close; Read; Write; Flush; Discard; and a set of methods for creating a snapshot of the VSD. A snapshot is a data structure that stores the state of the VSD at a particular point in time. The Create method generates the metadata associated with a VSD and stores the metadata on an RSD 214, making the VSD available to all nodes 210 in the cluster 200. The Open method enables applications in the VMs 360 to access the VSD (i.e., the I/O buffers 316 are generated in the shared memory 315 and the VSD is mounted to the guest OS 361). The Close method prevents applications in the VMs 360 from accessing the VSD. The Read method enables the BE Server 352 to read data from the VSD. The Write method enables the BE Server 352 to write data to the VSD. The Flush method flushes all pending I/O requests associated with the VSD. The Discard method discards a particular portion of data stored in memory associated with the VSD.

In one embodiment, two types of VSD objects 375 inherit from the generic VSD class: a SimpleVSD object and a ReliableVSD object. The SimpleVSD object is a simple virtual storage device that maps each block of addresses in the VSD to a single, corresponding block of addresses in an RSD 214. In other words, each block of data in the SimpleVSD object is only stored in a single location. The SimpleVSD object provides a high performance virtual storage solution but lacks reliability. In contrast, the ReliableVSD object is a redundant storage device that maps each block of addresses in the VSD to two or more corresponding blocks in two or more RSDs 214. In other words, the ReliableVSD object provides it-way replicated data and metadata. The ReliableVSD object may also implement error checking with optional data and/or metadata checksums. In one embodiment, the ReliableVSD object may be configured to store up to 15 redundant copies (i.e., 16 total copies) of the data stored in the VSD. The SimpleVSD object may be used for non-important data while the ReliableVSD object attempts to store data in a manner that prevents a single point of failure (SPOF) as well as provide certain automatic recovery capabilities when one or more nodes experiences a failure. The VSD Engine 353 may manage multiple types of VSD objects 375 simultaneously such that some data may be stored on SimpleVSD type VSDs and other data may be stored on ReliableVSD type VSDs. It will be appreciated that the two types of VSDs described herein are only two possible examples of VSD objects inheriting from the VSD class and other types of VSD objects 375 are contemplated as being within the scope of the present disclosure.

The RSD Engine 354 implements an RSD abstraction layer that provides access to all of the RSDs 214 coupled to the one or more nodes 210 of the cluster 200. The RSD abstraction layer enables communications with both local and remote RSDs 214. As used herein, a local RSD is an RSD 214 included in a particular node 210 that is hosting the instance of the BE Daemon 350. In contrast, a remote RSD is an RSD 214 included in a node 210 that is not hosting the instance of the BE Daemon 350 and is accessible via the network 370. The RSD abstraction layer provides reliable communications as well as passing disk or media errors from both local and remote RSDs 214 to the BE Daemon 350.

In one embodiment, the RSD abstraction layer is a set of objects defined using an OOP language. The RSD abstraction layer defines an RSD class that implements a common interface for all RSD objects 376 that includes the following methods: Read; Write; Allocate; and UpdateRefCounts. Each RSD object 376 is associated with a single RSD 214. In one embodiment, the methods of the RSD class are controlled by a pair of state machines that may be triggered by either the reception of packets from remote nodes 210 on the network 370 or the expiration of timers (e.g., interrupts). The Read method enables the VSD Engine 353 to read data from the RSD 214. The Write method enables the VSD Engine 353 to write data to the RSD 214. The Allocate method allocates a block of memory in the RSD 214 for storing data. The UpdateRefCounts method updates the reference counts for each block of the RSD 214, enabling deallocation of blocks with reference counts of zero (i.e., garbage collection).

In one embodiment, two types of RSD objects 376 inherit from the RSD class: an RSDLocal object and an RSDRemote object. The RSDLocal object implements the interface defined by the RSD class for local RSDs 214, while the RSDRemote object implements the interface defined by the RSD class for remote RSDs 214. The main difference between the RSDLocal objects and the RSDRemote objects are that the I/O Manager 355 asynchronously handles all I/O between the RSD Engine 354 and local RSDs 214, while the BE Remote Protocol 351 handles all I/O between the RSD Engine 354 and remote RSDs 214.

As discussed above, the SysMon 320 is responsible for the provisioning and monitoring of VSDs. In one embodiment, the SysMon 320 includes logic for generating instances of the VSD objects 375 and the RSD objects 376 in the memory 212 based on various parameters. For example, the SysMon 320 may discover how many RSDs 214 are connected to the nodes 210 of the cluster 200 and create a different RSD object 376 for each RSD 214 discovered. The SysMon 320 may also include logic for determining how many VSD objects 375 should be created and or shared by the VMs 360 implemented on the node 210. Once the SysMon 320 has generated the instances of the VSD objects 375 and the RSD objects 376 in the memory 212, the BE Daemon 350 is configured to manage the functions of the VSDs and the RSDs 214.

Figure 4:
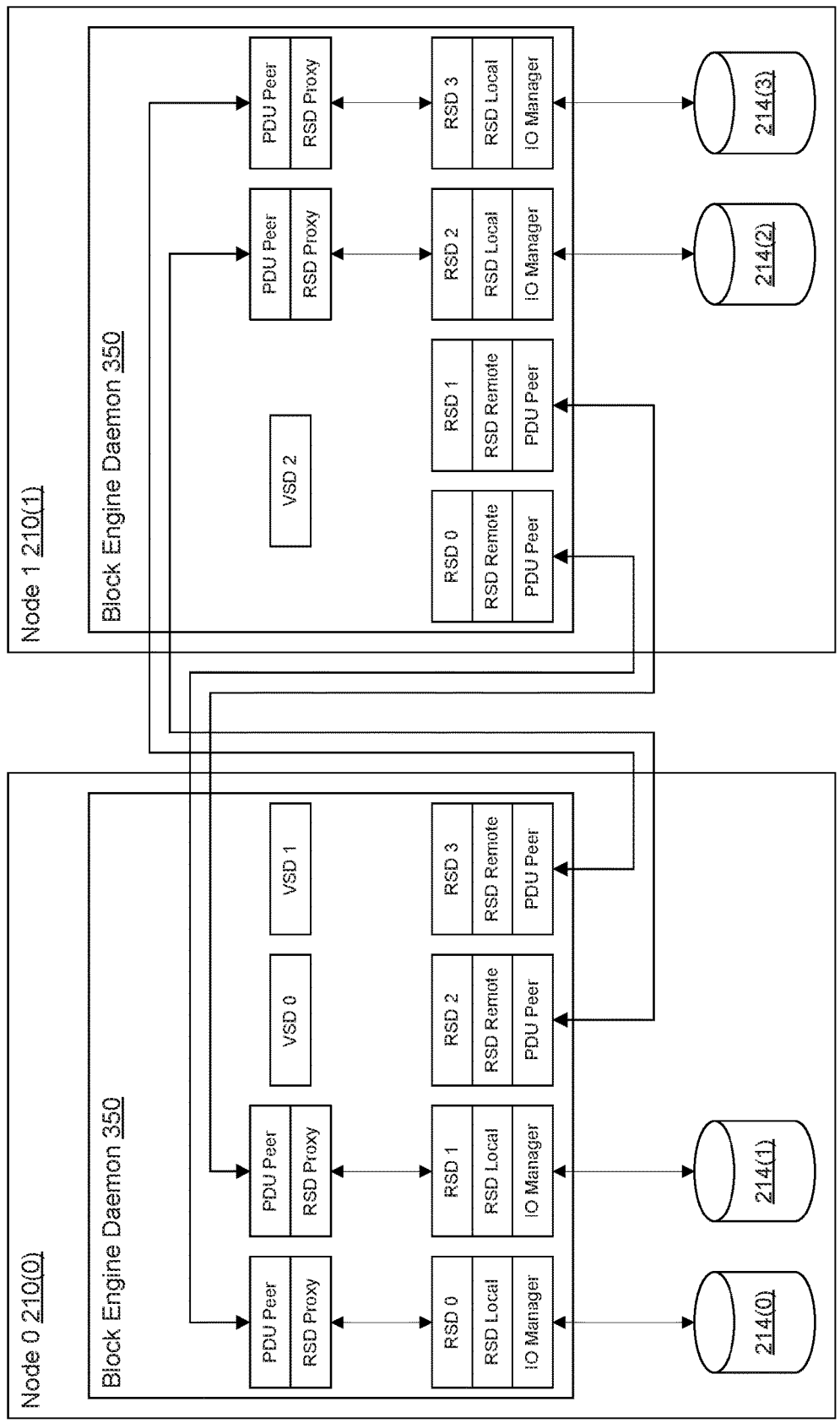
FIG. 4 is a conceptual diagram of the abstraction layers implemented by the block engine daemon for two nodes of the cluster, in accordance with one embodiment.

FIG. 4 is a conceptual diagram of the abstraction layers implemented by the BE Daemon 350 for two nodes 210 of the cluster 200, in accordance with one embodiment. A first node 210(0) is coupled to two local RSDs (i.e., 214(0) and 214(1)) and two remote RSDs (i.e., 214(2) and 214(3)) via the network 370. Similarly, a second node 210(1) is coupled to two local RSDs (i.e., 214(2) and 214(3)) and two remote RSDs (i.e., 214(0) and 214(1)) via the network 370. The RSD abstraction layer includes four RSD objects 376 (i.e., RSD 0, RSD 1, RSD 2, and RSD 3). In the first node 210(0), RSD 0 and RSD 1 are RSDLocal objects and RSD 2 and RSD 3 are RSDRemote objects.

The first node 210(0) accesses the first RSD 214(0) and the second RSD 214(1) via the I/O Manager library that makes system calls to the host operating system 311 in order to asynchronously read or write data to the local RSDs 214. An RSDLocal library is configured to provide an interface for applications communicating with the BE Daemon 350 to read or write to the local RSDs 214. The RSDLocal library may call methods defined by the interface implemented by the IOManager library. The first node 210(0) accesses the third RSD 214(2) and the fourth RSD 214(3) indirectly via a Protocol Data Unit Peer (PDUPeer) library that makes system calls to the host operating system 311 in order to communicate with other nodes 210 using the NIC 213. The PDUPeer library generates packets that include I/O requests for the remote RSDs (e.g., 214(2) and 214(3)). The packets may include information that specifies the type of request as well as data or a pointer to the data in the memory 212. For example, a packet may include data and a request to write the data to one of the remote RSDs 214. The request may include an address that specifies a block in the RSD 214 to write the data to and a size of the data. Alternately, a packet may include a request to read data from the remote RSD 214. The RSDProxy library unpacks requests from the packets received from the PDUPeer library and transmits the requests to the associated local RSD objects 376 as if the requests originated within the node 210.

The BE Remote Protocol 351, the BE Server 352, VSD Engine 353, RSD Engine 354, and the I/O Manager 355 implement various aspects of the RSD abstraction layer shown in FIG. 4. For example, the BE Remote Protocol 351 implements the RSDProxy library and the PDUPeer library, the RSD Engine 354 implements the RSDRemote library and the RSDLocal library, and the I/O Manager 355 implements the IOManager library. The second node 210(1) is configured similarly to the first node 210(0) except that the RSD objects 376 RSD 0 and RSD 1 are RSDRemote objects linked to the first RSD 214(0) and the second RSD 214(1), respectively, and the RSD objects 376 RSD 2 and RSD 3 are RSDLocal objects linked to the third RSD 214(2) and the fourth RSD 214(3), respectively.

The VSD abstraction layer includes three VSD objects 375 (i.e., VSD 0, VSD 1, and VSD 2). In the first node 210(0), VSD 0 and VSD 1 are ReliableVSD objects. In the second node 210(1), VSD 2 is a ReliableVSD object. It will be appreciated that one or more of the VSD objects 375 may be instantiated as SimpleVSD objects, and that the particular types of objects chosen depends on the characteristics of the system. Again, the VSD objects 375 provide an interface to map I/O requests associated with the corresponding VSD to one or more corresponding I/O requests associated with one or more RSDs 214. The VSD objects 375, through the Read or Write methods, are configured to translate the I/O request received from the BE Server 352 and generate corresponding I/O requests for the RSD(s) 214 based on the mapping table included in the VSD object 375. The translated I/O request is transmitted to the corresponding RSD 214 via the Read or Write methods in the RSD object 376.

Figure 5A:
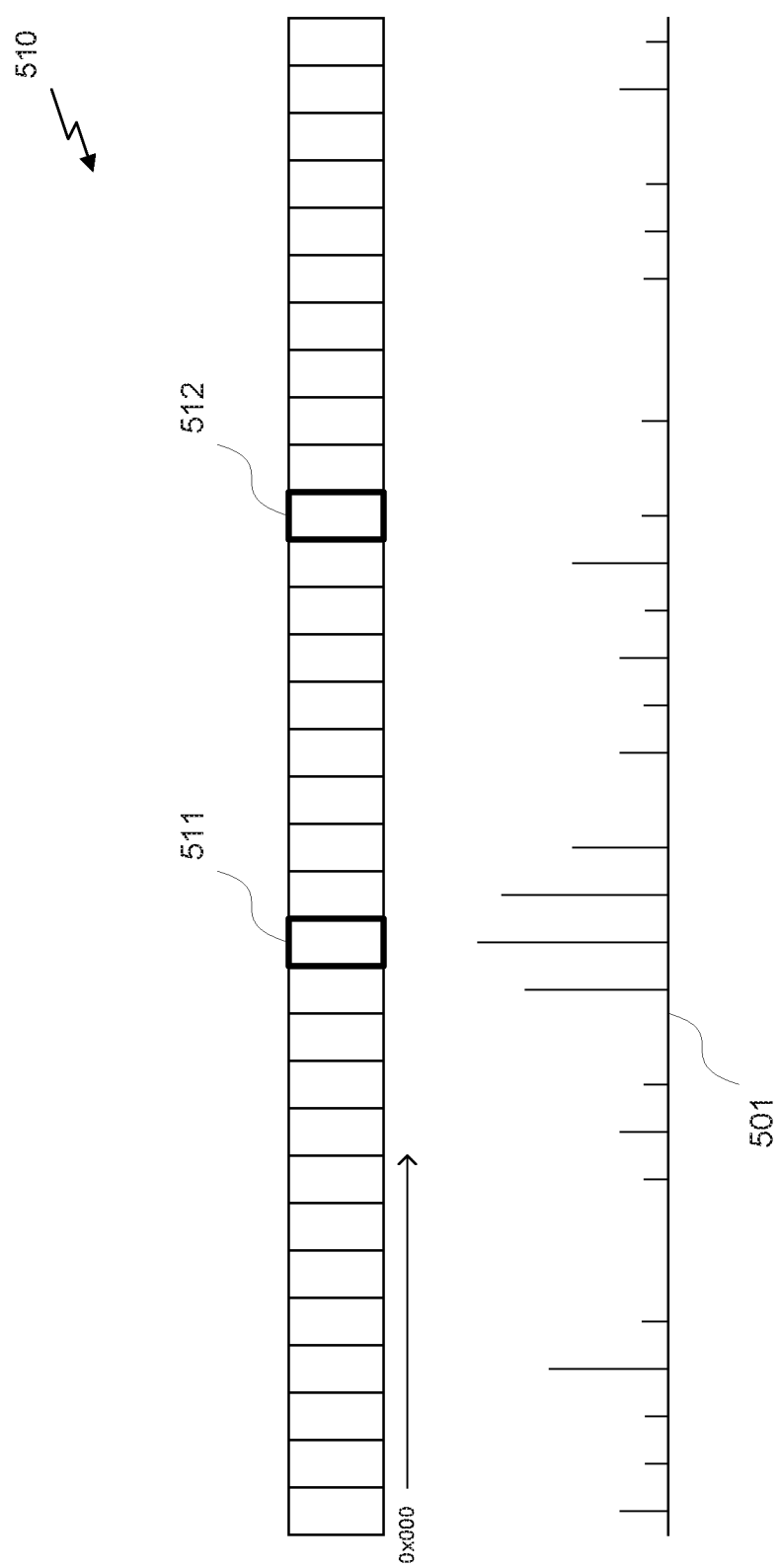
FIG. 5A is a conceptual diagram of a virtual storage device, in accordance with one embodiment.

FIG. 5A is a conceptual diagram of a VSD, in accordance with one embodiment. The VSD includes a plurality of blocks of memory in a contiguous virtual address space 510. The virtual address space 510 is mapped to a real address space associated with one or more RSDs 214. A virtual address space enables a contiguous address space to be used by applications executed within the VMs 360 even if the data referenced by the virtual memory addresses is stored in non-contiguous portions of memory across a plurality of RSDs 214. In addition, a larger addressable virtual address space may be mapped to a smaller real address space.

As shown in FIG. 5A, the virtual address space 510 is divided into a plurality of blocks of memory, such as block 511 and block 512. Each block of memory in the virtual address space 510 can be mapped to one or more corresponding blocks of memory in one or more RSDs 214 using the mapping table within the VSD object 375. In one embodiment, each block of memory includes 1 MB of storage. In other words, each block of memory includes $2^{20}$ bytes of data that are addressable using the 20 LSB (least significant bits) of a virtual memory address. The 20 LSB of the virtual memory address may be referred to as a block offset that identifies a particular byte of data within the block of memory.

The virtual address space 510 includes a number of blocks of memory based on the size of the VSD. In one embodiment, 32-bit virtual memory addresses may be implemented when addressing data within a VSD. In such an embodiment, a VSD may implement a virtual address space up to 4 GB. A 4 GB VSD would include 4096 blocks of memory. In such an embodiment, the 12 MSB (most significant bits) of a 32-bit virtual memory address may be referred to as a block identifier, which specifies a particular block of memory within the virtual address space. The virtual address space 510 shown in FIG. 5A includes a first block having a block identifier of 0x000, where the block identifier is incremented by one for each additional block of memory in the contiguous virtual address space 510.

In some embodiments, virtual memory addresses may be larger than 32-bits. A VSD could then provide more than 4 GB of addressable storage. In one embodiment, virtual memory addresses are 64-bits. A 64-bit virtual memory address enables a VSD to be sized up to 16 EiB, although in practice the size of a VSD may be much smaller. In one embodiment, a VSD is sized at 1 TB, using a subset of the 64-bit virtual address space. The virtual address space 510 in such an embodiment may utilize addresses between 0x0000 0000 0000 0000 and 0x0000 00FF FFFF FFFF. It will be appreciated that the size of a VSD may be chosen based on a particular application and is only limited by the range of the virtual address space. However, even though the size of a VSD is only limited by the range of the virtual address space, the actual storage capacity of a VSD is limited by the capacity of the available RSDs 214 on which the data is stored. So, while a VSD may be implemented that has up to 1 TB of addressable memory, if the capacity of RSDs 214 on which the data to be stored is limited to 500 GB, then only 500 GB worth of blocks of memory within the VSD may be allocated to store data. The capacity of the VSD may be increased by adding more RSDs 214 to the cluster 200.

Figure 5B:
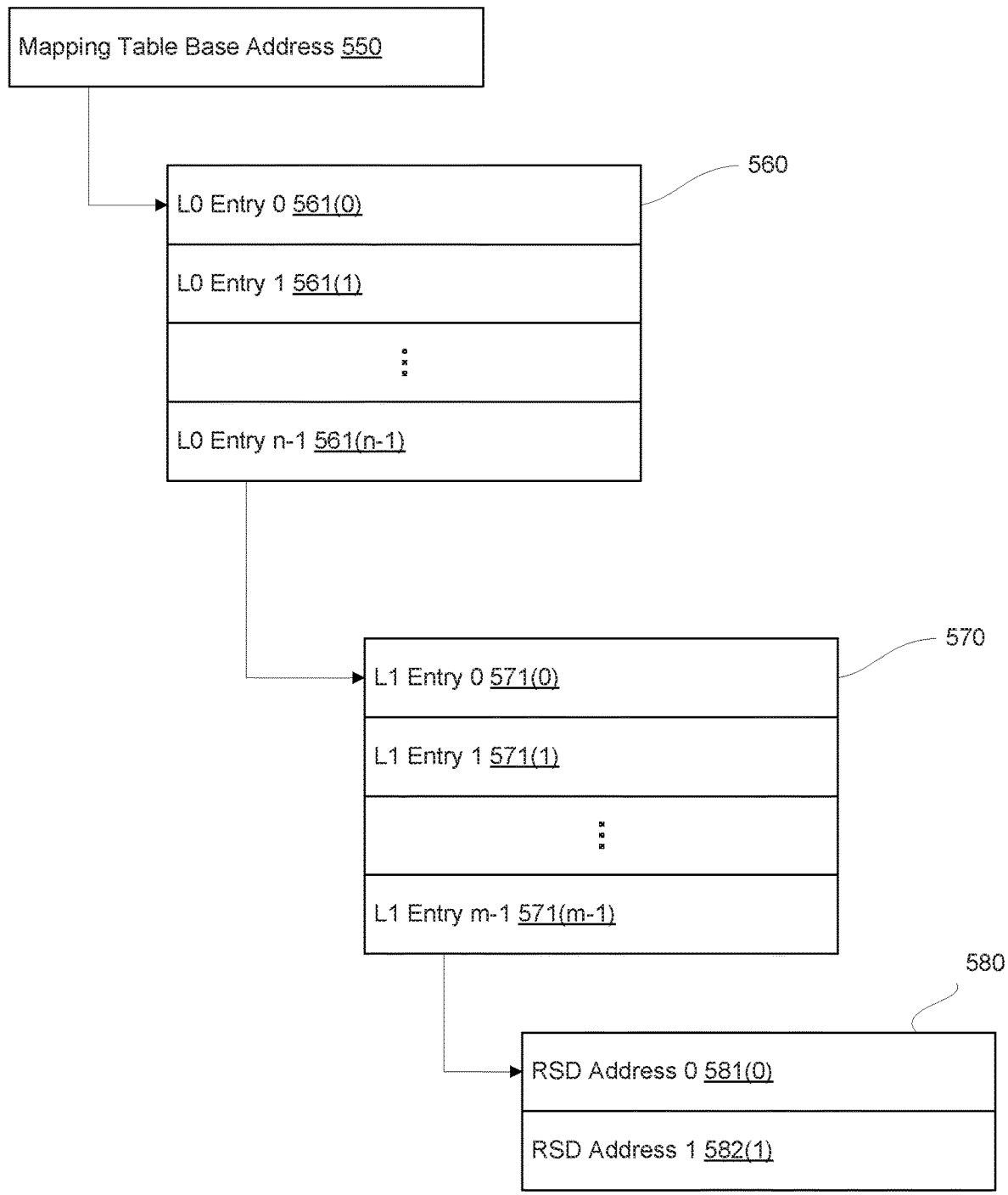
FIG. 5B illustrates a mapping table for a virtual storage device object, in accordance with one embodiment.

FIG. 5B illustrates a mapping table for a VSD object 375, in accordance with one embodiment. As shown in FIG. 5B, the VSD object 375 includes a base address 550 for a hierarchical mapping table that includes an L0 (level zero) table 560 and an L1 (level one) table 570. The mapping table essentially stores RSD addresses that map a particular block of memory in the VSD to one or more blocks of memory in the RSDs 214, depending on the replication factor for the VSD. The base address 550 points to the L0 table 560, which comprises an array of entries 561. Each entry 561 includes a base address of a corresponding L1 table 570. Similarly, the L1 table 570 comprises an array of entries 571 corresponding to a plurality of blocks of memory in the VSD. Each entry 571 may include an array 580 of RSD addresses that point to one or more blocks of memory in one or more RSDs 214 that store copies of the data for the block of memory in the VSD. The number of RSD addresses stored in each entry 571 of the L1 table 570 depends on the replication factor of the VSD. For example, a replication factor of two would include an array of two RSD addresses in each entry 571 of the L1 table 570. Although each entry 571 of the L1 table 570 is shown as including an array 580 of two RSD addresses, corresponding to a VSD replication factor of two, a different number of RSD addresses may be included in the array 580 stored in each entry 571 of the L1 table 570. In one embodiment, up to 16 RSD addresses may be included in the array 580 stored in each entry 571 of the L1 table 570.

The virtual memory address may be converted into a memory address in a second address space in order to access the data stored on one or more RSDs 214. In one embodiment, an RSD address is a 64-bit value that includes a version number, an RSD identifier (RSDid), and a sector. The version number may be specified by the 4 MSBs of the address, the RSDid may be specified by the next 12 MSBs of the address, and the sector may be specified by the 40 LSBs of the address (leaving 8 bits reserved between the RSDid and the sector). The 12-bit RSDid specifies a particular RSD 214 in the plurality of RSDs in the cluster 200, and the 40-bit sector specifies a particular block of memory in the particular RSD 214 that stores data for the corresponding block of memory in the VSD.

The virtual memory address may be used to perform a lookup operation into the mapping table of the VSD object 375 in order to find the RSD address for the corresponding block(s) of memory in the RSD(s) 214. For example, the block identifier of the virtual memory address may be used to index the mapping table and retrieve an RSD address. Then, the sector of the RSD address may be combined with the block offset of the virtual memory address to find the address of the data in the RSD 214. The RSDid from the RSD address may be used in order to determine which RSD 214 to read the data from or write the data to. In other words, the memory access request is processed by sending a request or a set of signals to a particular RSD 214 across an interface based on the RSDid.

The 40-bit sector in the RSD address may address 512 B of data on the RSD 214, which corresponds to a conventional size of a sector on a hard disk drive. However, the size of each block of memory may be configurable such that each 40-bit sector does not necessarily refer to a separate and distinct block of memory in an RSD 214. For example, each 1 MB block of memory would correspond to 2048 ($2^{11}$) 512 B sectors. In such a case, the 29 MSB of the 40-bit address would correspond to a block identifier for that particular RSD 214. All of the 40-bit sectors in the RSD addresses of the mapping table are, therefore, aligned to the start of each block and share the same value among a number of the LSB of the 40-bit sector.

In yet another embodiment, the 40-bit sector may correspond to a base address for a block of memory, which has a fixed size across all of the RSDs 214. If the size of the block of memory is configurable, then the 40-bit sector may refer to variable sized chunks of data and the 40-bit sector represents a block identifier that can be combined with the block offset of the virtual memory address. Alternatively, the 40-bit sector may be configured to reference a variable amount of data on each RSD 214. For example, the 40-bit sector associated with a first RSD may reference 512 B sectors on a hard disk drive. However, the 40-bit sector associated with a second RSD may reference 64 KB on a solid state drive. In such embodiments, the 40-bit sector is combined with the block offset of the virtual memory address in various ways to arrive at the correct address for the corresponding data on the particular RSD 214.

Different nodes may include different types of RSDs 214. As discussed above, some nodes 210 may include solid state drives that provide faster response time. However, storage capacity of solid state drives may be more expensive and, therefore, additional storage capacity may be provided in the form of, for example, a conventional disk array (e.g., a plurality of HDDs). In addition, RSDs 214 may be located on different nodes at different physical locations on the network 370. For example, some nodes 210 of the cluster 200 may be located in the United States while other nodes 210 of the cluster 200 may be located in Europe or Asia. Consequently, the response time of each RSD 214 may vary depending on which node initiates the memory access request and where the data is stored as well as what type of underlying technology the data is stored on.

For example, a node 210 may host a virtual machine configured as a web server. When that node 210 receives a request to access a web page, the web server may access data from a database to generate the web page and send it to the client. If the database is stored in an RSD 214 in that node, then the requested data may be accessed more quickly than if the data was stored on a remote node in Ireland, which would require external traffic across the network 370 to retrieve the data. Even if the database is stored on the local node 210, the node 210 may include multiple RSDs 214. If the database is stored on a solid state drive, then the data may be accessed more quickly than if the database is stored on a hard disk drive.

Of course, there are many factors that determine how quickly a memory access request is processed by a particular RSD 214. In addition to the speed of the underlying technology, the total number of requests made at any given time may slow down the response time as well, since requests must be serialized across a physical interface. If many memory access requests for a particular RSD 214 are received at the same time, then those memory access requests may be delayed as the bandwidth of the interface for the RSD 214 is limited.

In general, network managers may prefer to have data that is accessed more frequently on RSDs 214 that provide the fastest response time. For example, certain applications that are utilized by many clients may request similar data over and over again. In order to speed up these applications, the data that is accessed frequently could be moved to a solid state drive while other data that is only accessed infrequently is stored on slower hard disk drives. While this operation could be performed manually by the network manager by simply storing certain data on the solid state drives and other data on hard disk drives, sometimes the network manager cannot predict the particular frequency at which data is going to be accessed. In addition, some applications may generate data dynamically, which would require the network manager to constantly monitor data access patterns and correct inefficiencies by migrating data from one drive to another. Manual operations like this are time consuming and can be mishandled by the network manager. In addition, access patterns may change over time, which means an optimal allocation one week may no longer be optimal the next week, therefore requiring constant attention to make corrections.

One solution is to track the access patterns for each block of memory within each VSD to determine which blocks are accessed frequently and which blocks are accessed infrequently. The graph 501 in FIG. 5A shows a representation of the access frequency of different blocks of memory in the VSD. As shown, a first block 511 of memory is accessed more frequently than a second block 512 of memory. Consequently, it may be beneficial to store the first block 511 of memory in a faster RSD 214 than the second block 512 of memory.

FIG. 6 illustrates a heat map 600 for tracking the access frequency of blocks of memory in a VSD, in accordance with one embodiment. A unit of measure that represents the access frequency of a particular block may be referred to herein as heat. A block of memory in a VSD that is accessed frequently may be referred to as "hot" while a block of memory in a VSD that is accessed infrequently may be referred to as "cold." Each VSD object 375 may implement an instance of a heat map 600. The heat map 600 is an object that includes fields that store pointers to data structures for tracking the heat of each block of allocated memory within a corresponding VSD. The heat map 600 also implements methods for updating heat values associated with the blocks of memory in the VSD and triggering a reallocation operation for migrating the blocks of allocated memory among the different RSDs 214 in the cluster 200. A block of allocated memory within the VSD refers to a block of memory within the virtual address space 510 that has been allocated to store data and, therefore, is assigned one or more corresponding blocks of memory in one or more RSDs 214 to store copies of the data.

In one embodiment, the heat map 600 includes fields that store pointers to a set of data structures for tracking heat values for each allocated block of memory within the corresponding VSD. A first list 601 maps each block identifier for a block of allocated memory within the VSD to a corresponding heat value. A second list 602 maps each heat value to a set of corresponding block identifiers that are associated with that particular heat value. The first list 601 may be sorted according to the block identifiers and the second list 602 may be sorted according to the heat values. These sorted lists enable efficient searching of the heat map 600 to determine which blocks of memory in the VSD are associated with a heat value above a threshold value, which may trigger a routine that automatically moves data between different RSDs 214.

The lists 601 and 602 may be implemented as different data structures in different embodiments. In one embodiment, the lists 601 and 602 may be implemented as arrays, with each entry of the array including a block identifier/heat value pair, where the entries in the array are sorted according to a key that is set to either the block identifiers or the heat values. In another embodiment, the lists 601 and 602 may be implemented as a linked list, with each entry of the linked list including a block identifier/heat value pair as well as a pointer to the next entry of the linked list. In yet another embodiment, the lists 601 and 602 may be implemented as a tree data structure, such as a binary search tree. It will be appreciated that lists 601 and 602 may be implemented as other types of data structures as well as long as these data structures are capable of associating block identifiers with heat values.

Each of these data structures has benefits and disadvantages. For example, an array may be fast to search using a binary search algorithm but slow to insert a new item. A linked list may be slow to search. A tree data structure may be fast to insert a new item and may be fast to search for items as long as the tree is balanced, but rebalancing the tree data structure to ensure efficient search may be slow.

It will also be appreciated that, in some embodiments, the lists 601 and 602 may be implemented as a single data structure. The benefits to implementing complementary data structures is that a corresponding tuple can be easily determined by choosing to search one of the lists over the other based on the specific key to be used in the search. For example, the list 601 may be easier and quicker to search to find a heat value associated with a particular block identifier because the items in the list are sorted using the block identifiers as a key. Conversely, the list 602 may be easier and quicker to search to find a block identifier associated with a particular heat value (or to identify a set of block identifiers having a heat value above a threshold value) because the items in the list are sorted using the heat values as a key.

It will also be appreciated that, in some embodiments, the lists 601 and 602 may be implemented as different data structures. Each unique block identifier is associated with only one heat value, whereas each unique heat value may be associated with many block identifiers. Consequently, some embodiments may implement the lists 601 and 602 as different data structures because the list 601 has a one to one correspondence whereas the list 602 has a one to many correspondence.

In operation, each time the VSD Engine 353 receives a request to access a particular VSD (i.e., a memory access request), the VSD Engine 353 calls a method of the corresponding VSD object 375 associated with the VSD specified within the request. For example, the VSD Engine 353 may receive a write request to store data at a particular address within the VSD. The VSD Engine 353 may determine the VSD object 375 associated with the write request based on a VSD identifier included in the write request. The VSD Engine 353 then calls the Write( ) method of the VSD object 375. The VSD object 375 receives the write request (i.e., the method call) and calls a method of the heat map 600. The VSD object 375 passes a block identifier associated with the write request to the method of the heat map 600. The heat map 600 updates the heat value associated with the block of memory specified by the block identifier.

In one embodiment, the heat map 600 checks whether the first list 601 includes an entry corresponding with the block identifier. If there are no entries in the first list 601 that correspond to that block identifier, then the lack of any entries indicates that this block of memory has been recently allocated to store data and that this is the first time data is being stored in that block of memory. In this case, the heat map 600 will generate a new entry in the first list 601 and assign an initial heat value to that block of memory by creating a block identifier/heat value pair in the new entry. The heat map 600 also associates the initial heat value with the block of memory in the second list 602, either by generating a new entry in the second list 602 and assigning the new entry a heat value/block identifier pair or finding an entry in the second list 602 corresponding to the initial heat value and adding the block identifier for the block of memory to a set of block identifiers associated with that particular heat value.

However, if there is already an entry in the first list 601 that corresponds to that block identifier, then that indicates that the block of memory was allocated prior to one or more previous memory access requests and the heat value associated with the block of memory is updated. Updating the heat value may comprise incrementing the heat value in the entry corresponding to the block identifier for the block of memory in the first list 601. Updating the heat value may also comprise removing the block identifier for the block of memory from an entry in the second list 602 that corresponds with the previous heat value for the block of memory and inserting the block identifier for the block of memory in an entry in the second list 602 that corresponds with the updated (i.e., incremented) heat value. Although the example above describes updating the heat value associated with a block of memory whenever a write request is received by a VSD object 375, the heat value may similarly be updated when a read request is received by the VSD object 375.

In one embodiment, heat values are stored as 32-bit unsigned integers, which have a range between 0 and $2^{32}-1$. The initial heat value may be assigned as any heat value in this range. In one embodiment, the initial heat value is set to 1 and any subsequent memory access requests for the block of memory will result in the heat value being incremented.

As shown in FIG. 6, the heat map also includes a FIFO 603 that is used to keep track of a set of previous memory access requests associated with a VSD. The FIFO 603 may be included in the third set of data structures for tracking a history of memory access requests. As each memory access request is processed, the block identifier associated with the memory access request is pushed onto the FIFO 603 and the heat value for the corresponding block of memory is updated (e.g., incremented). A counter may also be incremented to track the number of block identifiers pushed onto the FIFO 603. The FIFO 603 is utilized to track a number of previous memory access requests associated with the VSD. The counter may be checked whenever a block identifier is pushed onto the FIFO 603. If the counter is above a threshold value (meaning that the FIFO 603 includes X number of block identifiers), then a block identifier may be popped from the FIFO 603. The heat map 600 may update the heat value for the block of memory corresponding to the block identifier popped from the FIFO 603. Updating the heat value may comprise decrementing the heat value in the entry corresponding to the block in the first list 601. Updating the heat value may also comprise removing the block identifier for the block of memory from a set of block identifiers in an entry in the second list 602 that corresponds with the previous heat value for the block of memory and inserting the block identifier for the block of memory to a set of block identifiers in an entry in the second list 602 that corresponds with the new heat value. In this manner, the heat value for a block of memory represents the access frequency associated with that block of memory within the previous X number of memory access requests for the VSD.

It will be appreciated that the heat value is incremented when a block identifier is pushed onto the FIFO 603 and decremented when a block identifier is popped from the FIFO 603 X number of memory access requests later. However, due to the one to one correspondence of incrementing and decrementing the heat value based on each memory access request, the heat value would never fall below the initial heat value, which would be the minimum heat value assigned to all blocks of allocated memory in the VSD. In one embodiment, the initial heat value may be set to indicate that a block of memory has a significant heat, such as 1000 (or some other value that may be configured by a network manager). The heat values for all blocks of memory are configured to decay periodically, such as every n seconds, minutes, or hours, regardless of how many memory access requests are processed by the VSD Engine 353. Periodically, the heat values in the heat map 600 may be decremented by one. Thus, an initial heat value will decay to zero over some time period if there are no memory access requests associated with that block of memory. After that time period, the heat value for a block of memory will solely reflect the number of memory access requests included within the previous X number of memory access requests for the VSD, less the number of time periods over which the X number of memory access requests were received.

Once the heat map 600 has been generated, the VSD Engine 353 may utilize the heat map 600 to reallocate different blocks of memory in the VSD among the different RSDs 214. In one embodiment, the blocks of memory associated with the largest heat values (i.e., the hottest blocks) may be moved to RSDs 214 with the fastest response times. It will be appreciated that blocks of memory that were once stored on the RSDs 214 with the fastest response times may be moved to RSDs 214 with slower response times to make room for other blocks of memory associated with larger heat values. In general, the VSD Engine 353 may reallocate the blocks of allocated memory in the VSD among the plurality of RSDs 214 based on the heat values associated with the blocks of allocated memory stored in the heat map 600.

However, in such a simple implementation, it may be difficult to track when this reallocation should be executed. For example, the heat values associated with blocks of memory may be changing rapidly due to the memory access patterns present within the system at any given time. A simple algorithm to place N number of blocks of memory with the largest heat values into a particular RSD 214, for example, could be difficult to implement as the N blocks of memory may be changing so frequently that swapping blocks of memory between the RSD 214 and other RSDs 214 may drastically reduce the available bandwidth for normal memory access operations. Thus, various algorithms should be implemented to reduce thrashing from constantly moving blocks of memory with heat values close to a threshold value on or off a particular RSD 214.

In one embodiment, the implementation of the algorithm could include only performing a reallocation operation infrequently, such as once per hour or once per day. In another embodiment, the implementation of the algorithm could include determining whether a threshold number of blocks of memory stored on a particular RSD 214 should be reallocated based on their current heat values. For example, if 25% of the blocks of memory stored on a particular RSD 214 have a heat value below a threshold value, then the reallocation operation is triggered. One exemplary implementation for triggering the reallocation of blocks of memory among the RSDs 214 is discussed below with respect to different tiers of RSDs 214.

Tiered Reallocation of Blocks of Memory Based on Heat Maps

Figure 7A:
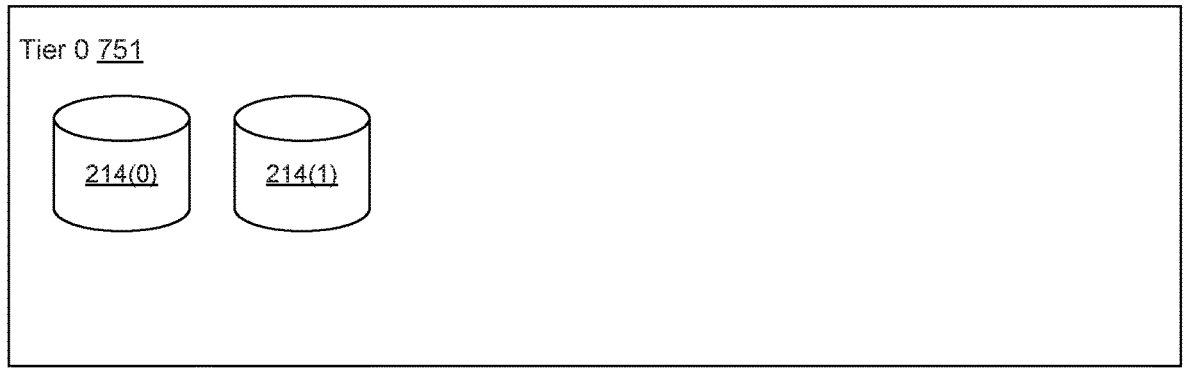
FIG. 7A illustrates a tiered classification of real storage devices, in accordance with one embodiment.
Figure 7A:
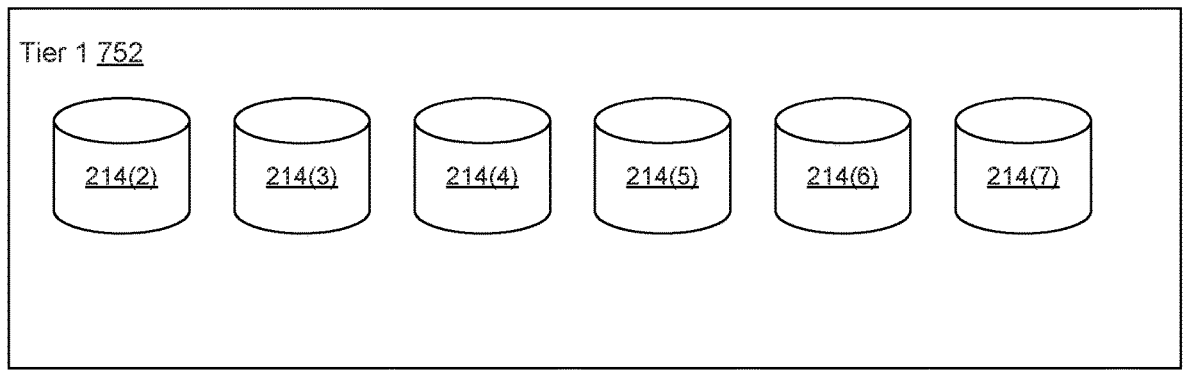

FIG. 7A illustrates a tiered classification of RSDs 214, in accordance with one embodiment. As shown in FIG. 7A, a cluster 200 may include eight RSDs 214, labeled RSD 214(0) through RSD 214(7), classified into two tiers. A first tier 751, Tier 0, includes a set of RSDs 214 that are classified in a higher performance class over a second set of RSDs 214 that are classified in a lower performance class. The first tier 751 includes a first RSD 214(0) and a second RSD 214(1). A second tier 752, Tier 1, includes the second set of RSDs 214 that are classified in the lower performance class. The second tier 752 includes a third RSD 214(2), a fourth RSD 214(3), a fifth RSD 214(4), a sixth RSD 214(5), a seventh RSD 214(6), and an eighth RSD 214(7). The RSDs 214 may be classified into the two tiers based on various factors including: (1) the type of RSD (e.g., SSD, HDD, etc.); (2) the bandwidth of the hardware interface implemented by the RSD (e.g., SCSI, ATA/IDE, SATA, SAS, etc.); (3) the average response time of the RSD; (4) the location of the RSD; (5) manual classification of the RSD by a network manager; or (6) any other applicable criteria selected based on a particular application. Although only two tiers are illustrated in FIG. 7A, additional tiers may exist as well to classify the RSDs 214 into three or more subsets of RSDs.

The RSDs 214 included in the first tier 751 may be used to store blocks of memory associated with large heat values based on the heat map 600. In other words, blocks of memory in a VSD associated with large heat values may be allocated blocks of memory in RSDs 214 in the first tier 751, whereas blocks of memory in the VSD associated with smaller heat values may be allocated blocks of memory in RSDs 214 in the second tier 752. In one embodiment, the VSD Engine 353 maintains a mapping that assigns each RSD 214 to a particular tier. The classification may be statically configured by a network manager or dynamically configured based on metadata that describes the RSDs 214 and/or statistics generated by the SysMon 320.

FIG. 7B illustrates a heat map 700 for tracking the access frequency of blocks of memory in a VSD, in accordance with another embodiment. The heat map 700 is similar to heat map 600, but the lists that map heat values to block identifiers and vice versa are split internally between tiers. As shown in FIG. 7B, the heat map 700 includes a first list 701 and a second list 702 for each distinct tier of RSDs 214. The first list 701 maps block identifiers to the heat value for each block of allocated memory in the VSD. The second list 702 maps heat values to sets of block identifiers that specify which blocks of allocated memory in the VSD are associated with that particular heat value.

Unlike the heat map 600 where entries for each block of memory are added to the same lists, entries in heat map 700 are added to the set of lists corresponding to the particular tier associated with the block of memory in the VSD. For example, a first memory access request for a block of memory in the VSD may be received by the VSD Engine 353. The VSD Engine 353 may determine the VSD object 375 associated with the memory access request based on a VSD identifier included in the memory access request. The VSD Engine 353 then calls a corresponding method (e.g., Write, Read, etc.) of the VSD object 375 based on the type of memory access request. The VSD object 375 receives the memory access request (i.e., the method call) and calls a method of the heat map 700. The VSD object 375 passes the virtual memory address associated with the memory access request as well as the tier corresponding to the virtual memory address to the method of the heat map 700. The heat map 700 updates the heat value associated with the block of memory specified by the virtual memory address in the set of lists corresponding to the tier.

The tier may be determined by mapping the virtual memory address to an RSD address within the mapping table of the VSD object 375. The RSD address provides an RSDid associated with the block of memory in the VSD. The RSDid may be passed to a method implemented by the VSD Engine 353 in order to retrieve the tier value associated with that RSD 214. This tier value may then be passed to the method implemented by the heat map 700.

It will be appreciated that some VSD objects 375 are instances of the ReliableVSD type, meaning that the mapping table in the VSD object 375 will map one block of memory in the VSD to two or more blocks of memory in one or more RSDs 214. In one embodiment, the tier returned will correspond to the RSD 214 associated with the first entry 581(0) in the array 580 stored in the entry of the L1 table 570 associated with the block of memory in the VSD. In the case of the ReliableVSD object, one copy of the data in one block of memory in an RSD 214 may be referred to as the primary copy of the data and all other copies of the data in other blocks of memory in the same or different RSDs 214 are referred to as redundant copies of the data. In such cases, all memory access requests associated with the block of memory of the VSD will attempt to be satisfied by accessing the primary copy of the data and the redundant copies of the data are only stored as backups in case of failure. It will be appreciated that the redundant copies of the data may also be accessed when the memory access request is a write request in order to ensure data consistency between the redundant copies of the data, but that writing the data to the blocks of memory storing the redundant copies of the data is lower priority and can often be performed asynchronously so that programs waiting on the write can continue execution once the write request to the primary copy of the data has been executed.

The heat map 700 will, therefore, store block identifier/ heat value pairs for each tier of RSDs 214 in independent sets of data structures, enabling easy reference to the smallest and largest heat value for all blocks of memory stored on all RSDs 214 within a particular tier. These minimum and maximum heat values per tier may be utilized to determine when to trigger a reallocation operation within the VSD.

In one embodiment, a delta heat value that represents a difference between minimum and maximum heat values between tiers may be utilized in order to trigger a reallocation operation. For example, a delta heat value between tier 0 751 and tier 1 752 may be calculated by subtracting the minimum heat value in tier 0 751 from the maximum heat value in tier 1 752. If the minimum heat value in tier 0 751 is greater than or equal to the maximum heat value in tier 1 752, then the delta heat value may be negative, which indicates that the allocation of blocks of memory in the VSD among the plurality of RSDs 214 is optimized. However, if the minimum heat value in tier 0 751 is less than the maximum heat value in tier 1 752, then the allocation of blocks of memory in the VSD among the plurality of RSDs 214 may not be optimized. In other words, there is at least one block of memory in tier 1 752 with a larger heat value than at least one other block of memory in tier 0 751. Nevertheless, in order to avoid unnecessary thrashing of the memory allocation, a reallocation operation may only be triggered if the delta heat value is greater than a threshold value, referred to herein as a trigger value.

In one embodiment, the delta heat value may be calculated each time a memory access request is performed. The delta heat value may be compared to the trigger value in order to determine whether a reallocation operation should be triggered. If the delta heat value is greater than the trigger value, then a callback function is executed that causes the VSD Engine 353 to launch a reallocation task.

In embodiments with more than two tiers, multiple delta heat values may be calculated, for each adjacent pair of tiers. For example, with four tiers, a first delta heat value may be calculated that indicates the difference between the minimum and maximum heat values of tier 0 and tier 1, respectively; a second delta heat value may be calculated that indicates the difference between the minimum and maximum heat values of tier 1 and tier 2, respectively; and a third delta heat value may be calculated that indicates the difference between the minimum and maximum heat values of tier 2 and tier 3, respectively. Each of the respective delta heat values may trigger a reallocation of blocks of memory within the RSDs 214 corresponding to that pair of tiers.

The reallocation task, once initiated, determines which blocks of memory need to be migrated from one tier to another tier. In one embodiment, the heat map 700 may implement a method GetCandidates that returns a set of block identifiers associated with blocks of memory that should be moved from one tier to another tier. In one embodiment, the GetCandidates method selects the set of block identifiers by selecting a number of block identifiers with either the largest heat values or smallest heat values from a particular tier as the set of block identifiers. The GetCandidates method may be called with a number of arguments including a tier blocks of memory will be removed from, a tier blocks of memory will be moved to, and a number of blocks of memory to move. If the tier blocks of memory will be removed from is classified in a higher performance class than the tier blocks of memory will be moved to (e.g., from tier 0 to tier 1), then a number of block identifiers associated with the lowest heat values from the higher performance class tier will be selected as the set of block identifiers. In contrast, if the tier blocks of memory will be removed from is classified in a lower performance class than the tier blocks of memory will be moved to (e.g., from tier 1 to tier 0), then a number of block identifiers associated with the highest heat values from the lower performance class tier will be selected as the set of block identifiers. This enables a network manager to configure the exact number of blocks of memory that may be reallocated as part of a reallocation operation as well as specify a ratio between blocks of memory moved from a higher performance class tier to a lower performance class tier and vice versa.

For example, up to 16 blocks of memory may be moved as part of a reallocation operation, where the blocks of memory are identified by calling the method GetCandidates (highTier, lowTier, x) to get a set of block identifiers that indicate which blocks of memory to move from the higher performance class tier to the lower performance class tier and calling the method GetCandidates(lowTier, highTier, y) to get a set of block identifiers that indicate which blocks of memory to move from the lower performance class tier to the higher performance class tier, where x+y is equal to 16. The ratio between x and y may be selected manually or set dynamically based on the number of blocks of free memory (i.e., unallocated blocks of memory) in each tier. For example, y might be larger than x when there are lots of blocks of free memory in the higher performance class tier as it is beneficial to move blocks of memory onto the RSDs 214 in the higher performance class tier. However, as the number of blocks of free memory in the higher performance class tier decreases, the ratio of x and y may change so that more blocks are moved from the higher performance class tier to the lower performance class tier to make room for new allocations.

The GetCandidates method may implement additional logic as well. For example, the set of block identifiers may be less than the number requested if the range of heat values associated with the set of block identifiers would be larger than the delta heat value. In other words, even though the delta heat value is larger than the trigger value, there could be a situation where there are outlier heat values in a particular tier (i.e., much hotter or much cooler than other heat values in the tier) and it would be inefficient to move the number of blocks of memory when the blocks of memory are associated with such disparate heat values. As another example, a minimum or maximum population of the tier may be enforced. For example, a minimum number of blocks of allocated memory should be utilized within a tier before any data is moved from that tier to a lower performance class tier. Thus, even if a particular block of memory is a candidate to be moved from one tier to another due to the heat value associated with that block of memory, the GetCandidates method will not include that block identifier (or any block identifier) in the set of block identifiers because the capacity of that tier of RSDs 214 is underutilized. In other words, it is better to place data on the available RSDs 214 in the highest performance class tier until that time where the total data stored on the RSDs 214 reaches some threshold where allocation of data between the tiers becomes necessary. In addition, the GetCandidates method could return additional block identifiers in the set of block identifiers that would normally not be included in the set if a maximum capacity of that tier is exceeded (i.e., there are below a threshold number of free blocks of memory in the tier). For example, the heat value associated with a particular block of memory is high enough where including the corresponding block identifier in the set of block identifiers to be moved from a higher performance class tier to a lower performance class tier is not warranted. However, because the number of blocks of free memory in the tier is below a threshold, the block identifier would be included in the set of block identifiers in order to free additional blocks of memory in the higher performance class tier for new data.

In another embodiment, the GetCandidates method selects the set of block identifiers by determining the difference between the delta heat value and the trigger value and selecting all block identifiers associated with heat values from a higher performance class tier that are within the difference of the minimum heat value for that tier. The blocks of memory associated with these block identifiers will be reallocated from the higher performance class tier to the lower performance class tier to ensure that, if the reallocation could be completed immediately, the delta heat value between the tiers would be less than or equal to the trigger value. Alternatively, in another embodiment, the set of block identifiers may be selected by determining the difference between the delta heat value and the trigger value and selecting all block identifiers associated with heat values from a lower performance class tier that are within the difference of the maximum heat value for that tier. The blocks of memory associated with these block identifiers will be reallocated from the lower performance class tier to the higher performance class tier to ensure that, if the reallocation could be completed immediately, the delta heat value between the tiers would be less than or equal to the trigger value.

In yet another embodiment, some combination of block identifiers may be selected from both the higher performance class tier and the lower performance class tier that, if the blocks of memory associated with those block identifiers were moved from their current tier to the other tier, the delta heat value between the tiers would be less than or equal to the trigger value. This could be performed by determining a first difference between the minimum heat value and the next minimum heat value in the higher performance class tier, determining a second difference between the maximum heat value and the next maximum heat value in the lower performance class tier, and determining the maximum of the first difference and the second difference. If the first difference is greater than the second difference, then the block identifier associated with the minimum heat value in the higher performance class tier is added to the set of block identifiers. If the second difference is greater than the first difference, then the block identifier associated with the maximum heat value in the lower performance class tier is added to the set of block identifiers. The process may be iteratively repeated, excluding any heat values corresponding to block identifiers already included in the set of block identifiers, until an updated delta heat value between the tiers, excluding any heat values for block identifiers included in the set of block identifiers, is less than or equal to the trigger value. Such an embodiment will reduce the delta heat value between the tiers to below the trigger value with the fewest number of blocks of memory being reallocated between tiers. It will be appreciated that some blocks of memory could be moved from a lower performance class tier to a higher performance class tier while other blocks of memory could be moved from a higher performance class tier to a lower performance class tier. It will also be appreciated that any reallocation operation is conditional on there being sufficient blocks of free memory in the RSDs 214 of a particular tier to enable the data from a block of memory in one tier to be moved to a block of memory in that tier.

By making the launch of the reallocation operation dependent on the delta heat value being greater than the trigger value, thrashing due to evenly distributed heat values is avoided. There may be a number of blocks of memory that are hot, and may benefit by being moved to a higher performance class tier, but since a large number of blocks of memory are associated with similar heat values, the reallocation operation will not be launched so the system does not waste time and bandwidth moving data between RSDs 214.

Figure 8:
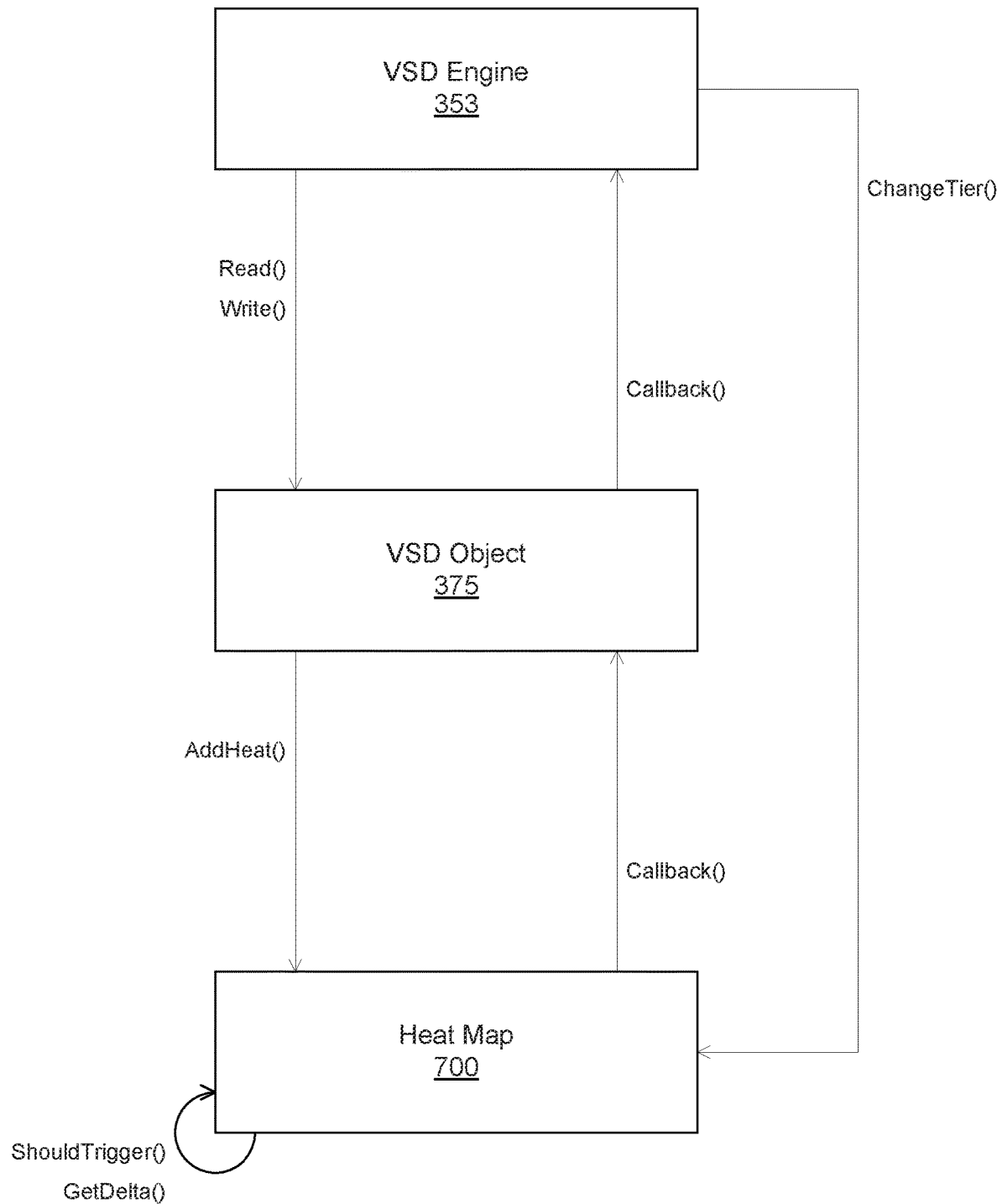
FIG. 8 is a conceptual diagram that illustrates a reallocation operation, in accordance with one embodiment.

FIG. 8 is a conceptual diagram that illustrates a reallocation operation, in accordance with one embodiment. The reallocation operation is performed by a task executed by the VSD Engine 353 that is triggered by the heat map 700 for a VSD object 375. As shown in FIG. 8, the VSD Engine 353 receives a memory access request from the BE server 352 as received from a BE client 363 of a VM 360. The VSD Engine 353 inspects the memory access request to determine the VSD object 375 associated with the request, such as by extracting a VSD identifier from a virtual memory address included in the memory access request.

The VSD Engine 353 transmits the memory access request to the VSD object 375 specified by the request by calling an appropriate method (e.g., Write, Read, etc.) of the VSD object 375. In response to receiving the memory access request, the VSD object 375 updates the heat map 700 by calling an AddHeat method of the heat map 700. In one embodiment, the AddHeat method may take two arguments, a block identifier for the block of memory in the VSD associated with the memory access request and a current tier corresponding to the block of memory. In response to receiving the request to update the heat for the block of memory in the VSD, the heat map 700 will check to determine whether the heat map 700 includes an entry corresponding to that block identifier in the lists for the identified tier. If an entry exists, then the heat value corresponding to that block identifier is incremented. If an entry does not exist, then a new entry will be added to the lists for the identified tier.

In one embodiment, the initial heat value for a new entry may depend on the identified tier. When a new entry is added to tier 1, the initial heat value may be set to 1. However, when a new entry is added to tier 0, the initial heat value may be set to the sum of the minimum heat value in tier 0 plus a constant. For example, the initial heat value for an entry in tier 0 may be set to the minimum heat value in tier 0 plus the trigger value. By using this initial heat value that is above the minimum heat value by some amount, it will help avoid the block of memory being selected as a candidate to be reallocated to a different tier immediately after being allocated within a current tier.

The AddHeat method may trigger an operation to determine whether reallocation should be performed after the heat value for the current block of memory is updated. In one embodiment, the AddHeat method may call a ShouldTrigger method of the heat map 700 in order to determine whether a reallocation operation should be triggered. The ShouldTrigger method returns a Boolean value based on a delta heat value being greater than or equal to a trigger value or a population of tier 0 being greater than or equal to a population threshold. In other words, the reallocation operation is triggered if the delta value becomes too large or the population of tier 0 gets close to full capacity. The ShouldTrigger method calls a GetDelta method in order to calculate the delta heat value based on the minimum and maximum heat values in the different tiers.

The heat map 700 may also implement a SetCallback method that enables the VSD object 375 to specify the callback function executed by the heat map 700 when the AddHeat method has completed. The SetCallback method may also specify the trigger value and the population threshold utilized by the ShouldTrigger method. The Boolean result of the ShouldTrigger method may be passed back to the VSD object 375 as an argument of the callback function.

The callback function implemented by the VSD object 375 calls a callback function of the VSD Engine 353, and the Boolean result of the ShouldTrigger method may be passed back to the VSD Engine 353 as an argument of the callback function. If the Boolean result of the ShouldTrigger method is true, then a reallocation operation may be executed by the VSD Engine 353. If the Boolean result of the ShouldTrigger method is false, then the reallocation operation is not executed. The reallocation operation may be executed by creating a task to be processed by the VSD Engine 353 in parallel with other tasks such as tasks associated with servicing additional memory access requests received for one or more VSDs.

In one embodiment, the VSD Engine 353 executes the reallocation operation by creating a VSDRetier task. The VSDRetier task may have access to a pointer for the VSD object 375 for the VSD being reallocated. The VSDRetier task may call the GetCandidates method of the heat map 700 for the VSD object 375 specified by the pointer in order to get a set of block identifiers that should be migrated from one tier to another tier. As discussed above, the VSDRetier task may include logic for making multiple calls to the GetCandidates method using different arguments in order to receive sets of block identifiers to move up or down among the different tiers. For each block identifier in the set of block identifiers returned by a call to the GetCandidates method, the VSDRetier task may generate an EntryRetier task corresponding to the block identifier.

The EntryRetier task is responsible for migrating the block of memory from one RSD 214 in a current tier to another RSD 214 in a new tier. In one embodiment, the EntryRetier task uses a mutex mechanism to acquire an exclusive lock on the entry 571 in the L1 table 570 for the block of memory in the VSD, relocate the block of memory by copying the data from a block of memory in the current RSD 214 to a block of memory in a new RSD 214, update the entry 571 in the L1 table 570 to indicate the block of memory in the VSD is mapped to the block of memory in the new RSD 214 by writing a corresponding RSD address to the entry 571, call a ChangeTier method of the heat map 700 to remove the entry for the block of memory in the lists of the current tier and add an entry for the block of memory to the lists in the new tier, and release the exclusive lock of the mutex mechanism. It will be appreciated that copying data from one block of memory in a first RSD 214 to another block of memory in a second RSD 214 will generate many Read and Write calls to the VSD object 375 as each byte of data in the block of memory must be read from the first RSD 214 and written to the second RSD 214. The mutex mechanism is used to prevent the data from being written during migration of the block of memory from one RSD 214 to the other RSD 214. In some embodiments, the mutex mechanism may not be used, although any memory access requests associated with the block of memory that are processed during migration may need to be performed in both the first RSD 214 and second RSD 214 to ensure that the data stays consistent during the migration.

A number of EntryRetier tasks may be executed in parallel by the VSD Engine 353. In one embodiment, up to 16 EntryRetier tasks may be executed in parallel, meaning that up to 16 blocks of memory may be migrated from one tier to another tier in parallel. The VSDRetier task manages each of the EntryRetier tasks and tracks when all of the generated EntryRetier tasks have been completed. After each of the number of EntryRetier tasks has completed, the VSDRetier task may call the ShouldTrigger method of the heat map 700 again, which calls the GetDelta method of the heat map 700 with the updated heat values and determines if additional blocks of memory should be migrated between tiers. If additional blocks of memory should be migrated, then the Boolean result of the ShouldTrigger method is passed up to the VSD Engine 353 via the callback methods and a new VSDRetier task may be created that requests new candidates from the heat map 700 to be moved between tiers.

Figure 9A:
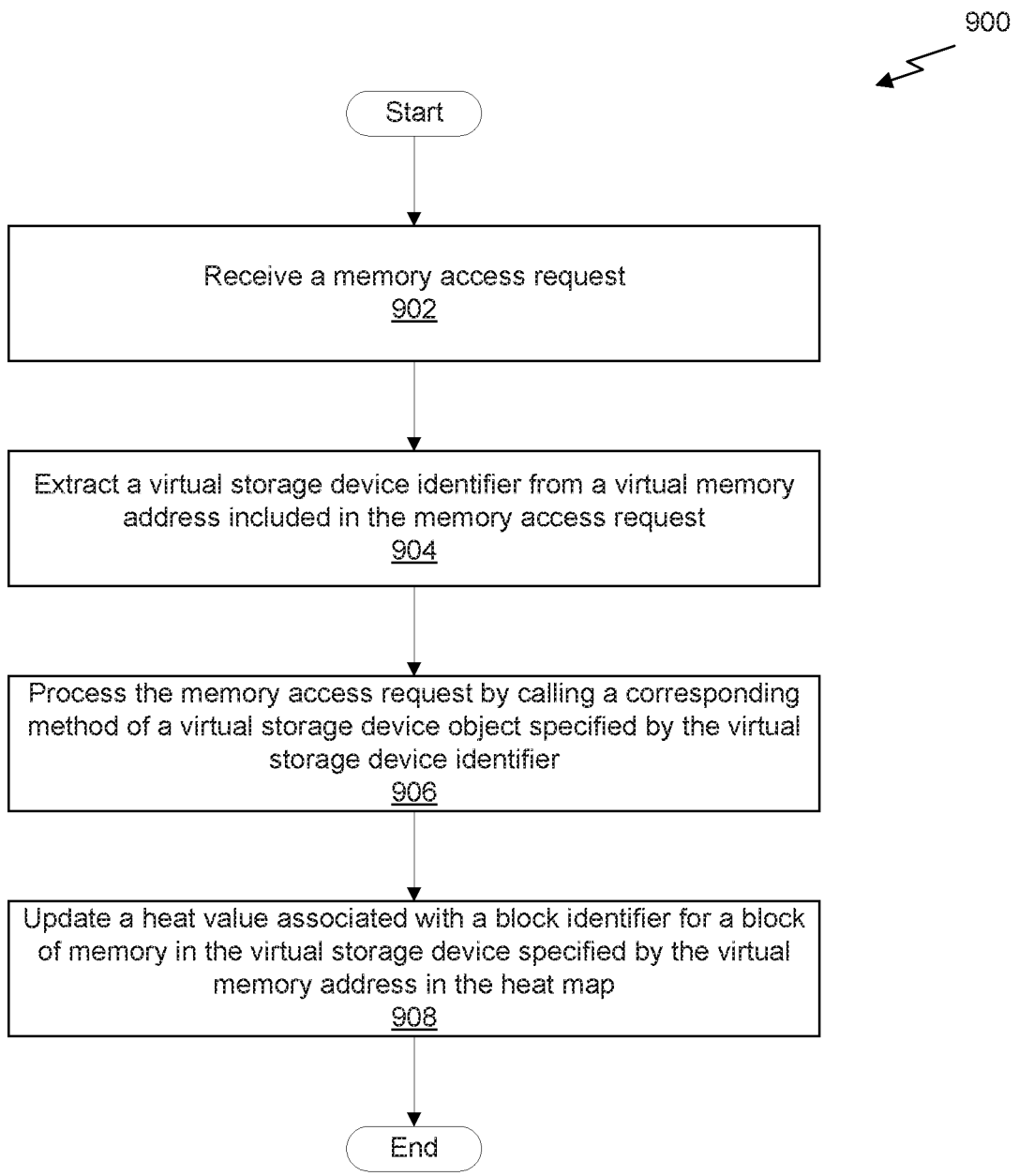
FIG. 9A illustrates a flowchart of a method for tracking the access frequency for a plurality of blocks of memory, in accordance with one embodiment.

FIG. 9A illustrates a flowchart of a method 900 for tracking the access frequency for a plurality of blocks of memory, in accordance with one embodiment. At step 902, a memory access request is received from the BE Server 352 at the VSD Engine 353. The memory access request may include a virtual memory address. At step 904, the VSD Engine 353 extracts a VSD identifier from the virtual memory address included in the memory access request.

At step 906, the VSD Engine 353 processes the memory access request by calling a corresponding method of a VSD object 375 specified by the VSD identifier. Depending on the type of memory access request, the VSD Engine 353 may call a Read method or a Write method of the VSD object 375.

At step 908, a heat value associated with a block identifier for a block of memory in the VSD specified by the virtual memory address in the heat map 700 is updated. In one embodiment, the corresponding method of the VSD object 375 (e.g., the Read method or the Write method) calls an AddHeat method of the heat map 700 to update the heat value associated with the block identifier. The AddHeat method is configured to increment the heat value in an entry of the heat map corresponding to the block identifier by one or add a new entry to the heat map for the block identifier. The new entry may include an initial heat value that is selected based on a tier associated with the block of memory specified by the block identifier. For example, the initial heat value may be set to a sum of a minimum heat value associated with tier 0 and a trigger value if the tier associated with the block of memory is tier 0 or set to 1 otherwise. Method 900 may be performed for each memory access request received by the VSD Engine 353.

Figure 9B:
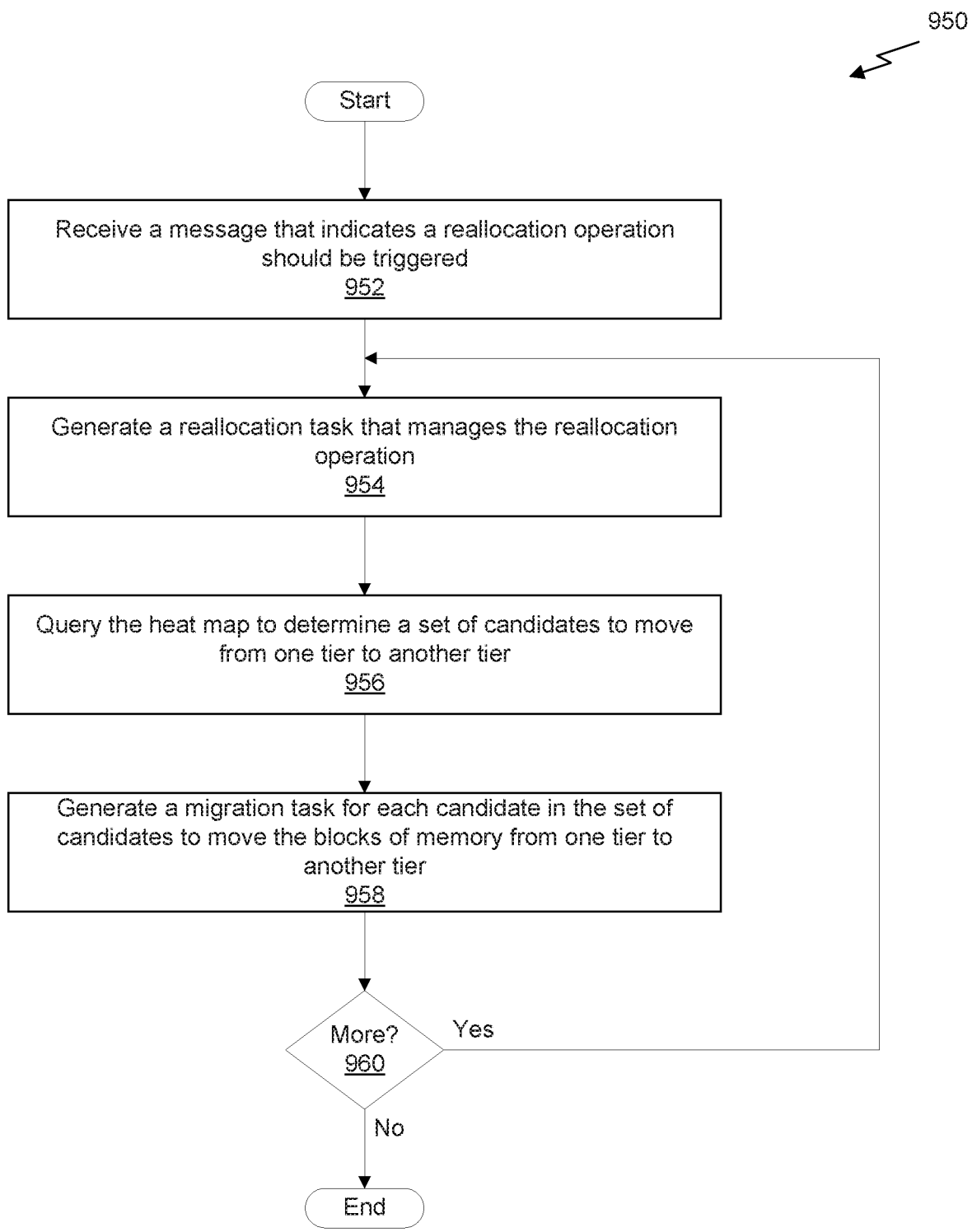
FIG. 9B illustrates a flowchart of a method for tracking the access frequency for a plurality of blocks of memory, in accordance with one embodiment.

FIG. 9B illustrates a flowchart of a method 950 for tracking the access frequency for a plurality of blocks of memory, in accordance with one embodiment. At step 952, a message is received that indicates a reallocation operation should be triggered. In one embodiment, the VSD Engine 353 receives the message via a Boolean argument of a callback function that is passed from the heat map 700 to the VSD object 375 and then to the VSD Engine 353. A true value indicates that the reallocation operation should be executed. A false value indicates that the reallocation operation should not be executed. The Boolean argument may be referred to as a trigger indicator. The Boolean argument may be set by the ShouldTrigger method implemented by the heat map 700 and called within the AddHeat method whenever a heat value is updated in response to a memory access request being processed by the VSD Engine 353.

At step 954, a reallocation task is generated that, when executed by the VSD Engine 353, manages the reallocation operation. In one embodiment, the VSD Engine 353 launches a VSDRetier task in response to receiving the trigger indicator set to true. The VSDRetier task is responsible for managing the migration of the candidates for reallocation from one tier to another tier. At step 956, the VSD Engine 353, via the VSDRetier task, queries the heat map 700 to determine a set of candidates to move from one tier to another tier. As used herein, the set of candidates refers to a set of block identifiers that specify blocks of memory to move from an RSD 214 in one tier to an RSD 214 in another tier. The heat map 700 may be queried by calling the GetCandidates method of the heat map 700.

At step 958, the VSD Engine 353 generates a migration task for each candidate in the set of candidates to move the blocks of memory from one tier to another tier. In one embodiment, the VSD Engine 353 launches an EntryRetier task for each block identifier returned in the set of identifiers by the GetCandidates method. The EntryRetier task is responsible for managing the migration of a particular block of memory from one tier to another tier.

At step 960, the VSDEngine 353 determines whether more blocks of memory should be reallocated. In one embodiment, the VSDRetier task is configured to call the ShouldTrigger method of the heat map 700 after all of the candidates in the set of candidates have completed migration from one tier to another. The ShouldTrigger method will call the GetDelta method of the heat map 700, which will calculate a new delta heat value based on the new allocation of the blocks of memory in the VSD after the migration of the previous set of candidates. If the ShouldTrigger method returns false, then method 950 is terminated. However, if the ShouldTrigger method returns true, then the method returns to step 954 where a new VSDRetier task is generated to manage the migration of a new set of candidates from one tier to another tier.

Figure 10:
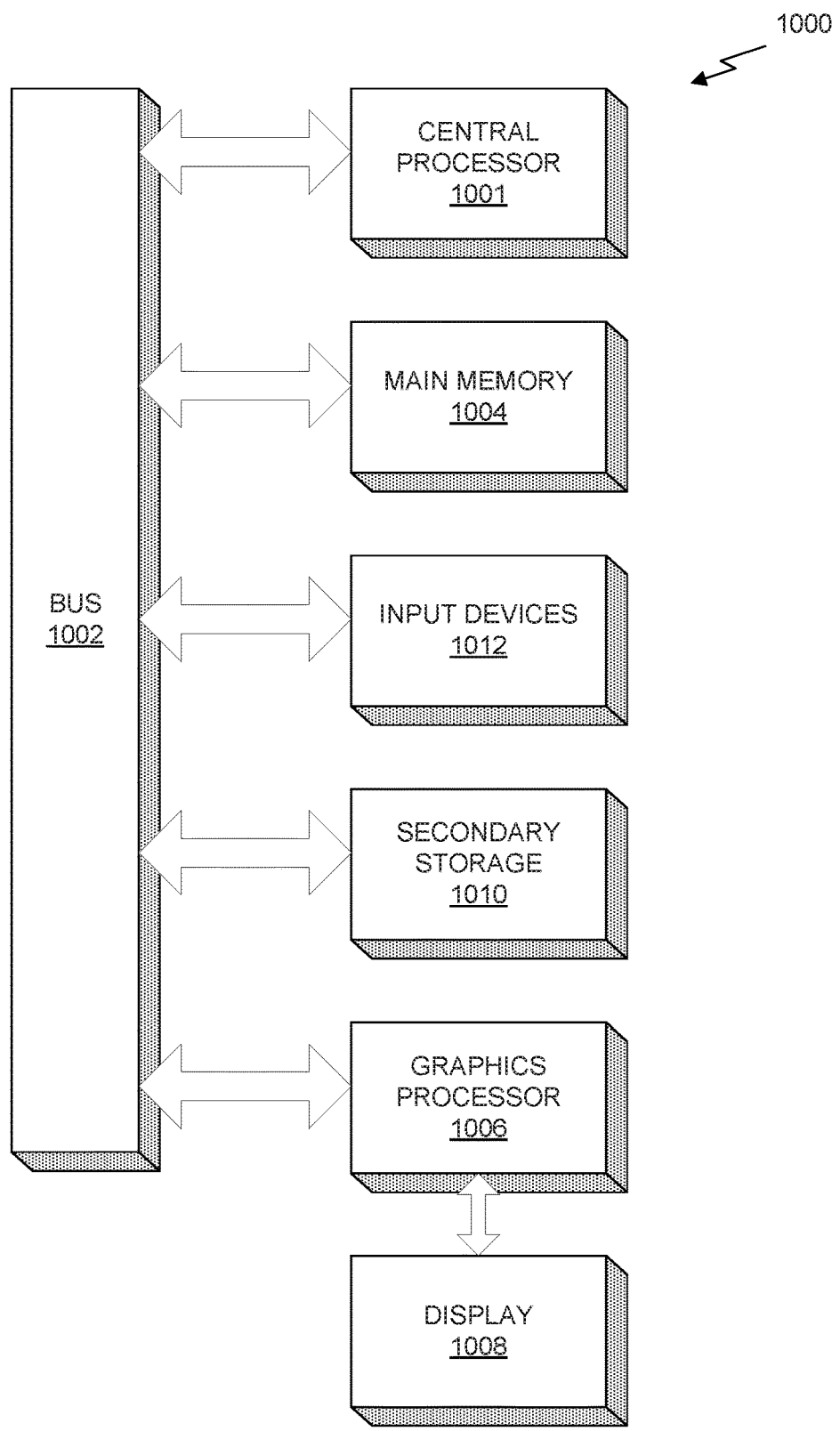
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. The system 1000 may comprise a node 210 of the cluster 200. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1004 and/or the secondary storage 1010. Such computer programs, when executed, enable the system 1000 to perform various functions. The memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    generating a heat map for a virtual storage device (VSD) in a memory, wherein the heat map includes:
        for each tier of real storage devices (RSDs) in a plurality of tiers of RSDs associated with the VSD, a first data structure that maps block identifiers corresponding to a plurality of blocks of memory in the VSD to corresponding heat values,
        and a second data structure that maps each heat value in the plurality of heat values included in the first data structure to a corresponding set of the block identifiers in the first data structure associated with the heat value;
    and a first-in, first-out (FIFO) queue for tracking a previous number of memory access requests associated with the VSD;
    receiving a memory access request for a particular block of memory of a particular tier in the VSD;
    responsive to receiving the memory access request, incrementing a first heat value corresponding to a first block identifier for the particular block of memory and pushing the first block identifier onto the FIFO queue, wherein the first heat value is in the first data structure of the particular tier;
    periodically, at the expiration of each time period in a number of time periods, decrementing each heat value in the first data structure of the particular tier by one;
    and reallocating, in a reallocation task performed by a VSD Engine, the plurality of blocks of memory in the VSD among a plurality of blocks of memory in two or more RSDs based on the heat map, wherein the reallocation task is triggered based on a minimum heat value and a maximum heat value of at least two tiers of RSDs, wherein the minimum heat value is the minimum of the heat values in the second data structure of one tier of the at least two tiers of RSDs, and the maximum heat value is the maximum of the heat values in the second data structure of another tier of the at least two tiers of RSDs.

2. The method of claim 1, further comprising:
    responsive to receiving the memory access request, incrementing a counter that tracks a number of block identifiers in the FIFO queue;
    and when the counter is equal to a threshold value:
        popping a second block identifier from the FIFO queue, decrementing a second heat value corresponding to the second block identifier, and decrementing the counter by one, wherein the second heat value is in the first data structure of the particular tier.

3. The method of claim 1, further comprising setting at least one heat value in the first data structure for each tier of the at least two tiers of RSDs to an initial heat value that is greater than a minimum heat value.

4. The method of claim 1, wherein the two or more RSDs are classified into at least two tiers including a first tier and a second tier, and wherein the first tier includes a first subset of RSDs that are classified in a higher performance class than a second subset of RSDs included in the second tier.

5. The method of claim 4, further comprising:
calculating a delta heat value by subtracting a minimum heat value associated with the first tier from a maximum heat value associated with the second tier,
wherein reallocating the plurality of blocks of memory in the virtual storage device is triggered based on a comparison of the delta heat value with a trigger value that is greater than zero.

6. The method of claim 5, further comprising identifying candidate blocks of memory selected from the first tier for reallocation to the second tier utilizing the heat map.

7. The method of claim 1, wherein the heat map is associated with a VSD object that includes a mapping table that maps each block of memory in the plurality of blocks of memory in the VSD to at least one block of memory in the plurality of blocks of memory in the two or more RSDs.

8. The method of claim 1, wherein receiving the memory access request for the particular block of memory in the VSD comprises:
receiving, by the VSD Engine, the memory access request from a block engine (BE) Server;
extracting a VSD identifier from a virtual memory address included in the memory access request; and
processing the memory access request by calling a corresponding method of a VSD object specified by the VSD identifier.

9. The method of claim 1, further comprising, responsive to receiving the memory access request:
determining that the first data structure for a particular tier of RSDs included in the heat map does not include an entry corresponding to the first block identifier; and
adding a new entry for the first block identifier to the first data structure for the particular tier of RSDs included in the heat map, wherein the new entry maps the first block identifier to an initial heat value.

10. The method of claim 9, wherein the initial heat value is selected based on the particular tier associated with the block of memory.

11. A non-transitory computer-readable storage medium storing instructions that, when executed by a processor, cause the processor to perform steps comprising:
generating a heat map for a virtual storage device (VSD) in a memory, wherein the heat map includes:
for each tier of real storage devices (RSDs) in a plurality of tiers of RSDs associated with the VSD, a first data structure that maps block identifiers corresponding to a plurality of blocks of memory in the VSD to corresponding heat values,
and a second data structure that maps each heat value in a plurality of heat values included in the first data structure to a set of corresponding block identifiers in the first data structure associated with the heat value;
and a first-in, first-out (FIFO) queue for tracking a previous number of memory access requests associated with the VSD;
receiving a memory access request for a particular block of memory of a particular tier in the VSD;
responsive to receiving the memory access request, incrementing a first heat value corresponding to a first block identifier for the particular block of memory and pushing the first block identifier onto the FIFO queue, wherein the first heat value is in in the first data structure of the particular tier;
periodically, at the expiration of each time period in a number of time periods, decrementing each heat value in the first data structure of the the particular tier by one;
and reallocating, in a reallocation task performed by a VSD Engine, the plurality of blocks of memory in the VSD among a plurality of blocks of memory in two or more RSDs based the heat map, wherein the reallocation task is triggered based on a minimum heat value and a maximum heat value of at least two tiers of RSDs, wherein the minimum heat value is the minimum of the heat values in the second data structure of one tier of the at least two tiers of RSDs, and the maximum heat value is the maximum of the heat values in the second data structure of another tier of the at least two tiers of RSDs.

12. The non-transitory computer-readable medium of claim 11, the steps further comprising:
responsive to receiving the memory access request, incrementing a counter that tracks a number of block identifiers in the FIFO queue; and when the counter is equal to a threshold value:
popping a second block identifier from the FIFO queue, decrementing a second heat value corresponding to the second block identifier, and decrementing the counter by one, wherein the second heat value is in the first data structure of the particular tier.

13. The non-transitory computer-readable medium of claim 11, wherein the two or more RSDs are classified into at least two tiers including a first tier and a second tier, and wherein the first tier includes a first subset of RSDs that are classified in a higher performance class than a second subset of RSDs included in the second tier.

14. The non-transitory computer-readable medium of claim 13, the steps further comprising:
calculating a delta heat value by subtracting a minimum heat value associated with the first tier from a maximum heat value associated with the second tier,
wherein reallocating the plurality of blocks of memory in the virtual storage device is triggered based on a comparison of the delta heat value with a trigger value that is greater than zero.

15. A system comprising:
at least one node, each node in the at least one node including a processor and a memory;
a plurality of real storage devices (RSDs) coupled to the at least one node, wherein each RSD in the plurality of RSDs is configured as a block device that is divided into blocks of memory;
and a virtual storage device (VSD) Engine executed by the processor in a first node of the at least one node, the VSD Engine configured to:
generate a heat map for a VSD in the memory of the first node, wherein the heat map includes:
for each tier of real storage devices (RSDs) in a plurality of tiers of RSDs associated with the VSD, a first data structure that maps block identifiers corresponding to a plurality of blocks of memory in the VSD to corresponding heat values,
and a second data structure that maps each heat value in a plurality of heat values included in the first data structure to a set of corresponding block identifiers in the first data structure associated with the heat value;

and a first-in, first-out (FIFO) queue for tracking a previous number of memory access requests associated with the VSD, receive a memory access request for a particular block of memory of a particular tier in the VSD, responsive to receiving the memory access request, increment a first heat value corresponding to a first block identifier for the particular block of memory and pushing the first block identifier onto the FIFO queue, wherein the first heat value is in the first data structure of the particular tier, periodically, at the expiration of each time period in a number of time periods, decrement each heat value in the first data structure of the particular tier by one, and reallocate, via a reallocation task, the plurality of blocks of memory in the VSD among a plurality of blocks of memory in two or more RSDs based on the heat map, wherein the reallocation task is triggered based on a minimum heat value and a maximum heat value of at least two tiers of RSDs, wherein the minimum heat value is the minimum of the heat values in the second data structure of one tier of the at least two tiers of RSDs, and the maximum heat value is the maximum of the heat values in the second data structure of another tier of the at least two tiers of RSDs.

16. The system of claim 15, the VSD Engine further configured to:

responsive to receiving the memory access request, increment a counter that tracks a number of block identifiers in the FIFO queue;

and when the counter is equal to a threshold value:
pop a second block identifier from the FIFO queue, decrement a second heat value corresponding to the second block identifier, and decrement the counter by one, wherein the second heat value is in the first data structure of the particular tier.

17. The system of claim 15, wherein the two or more RSDs are classified into at least two tiers including a first tier and a second tier, wherein the first tier includes a first subset of RSDs that are classified in a higher performance class than a second subset of RSDs in the second tier, and wherein the first subset of RSDs includes at least one solid state drive (SSD) and the second subset of RSDs includes at least one hard disk drive (HDD).

18. The system of claim 17, the VSD Engine further configured to:

calculate a delta heat value by subtracting a minimum heat value associated with the first tier from a maximum heat value associated with the second tier, wherein reallocating the plurality of blocks of memory in the VSD is triggered based on a comparison of the delta heat value with a trigger value that is greater than zero.

19. The system of claim 15, the VSD Engine further configured to, responsive to receiving the memory access request:

determine that the first data structure for a particular tier of RSDs included in the heat map does not include an entry corresponding to the first block identifier; and add a new entry for the first block identifier to the first data structure for the particular tier of RSDs included in the heat map, wherein the new entry maps the first block identifier to an initial heat value.

20. The system of claim 19, wherein the initial heat value is selected based on the particular tier associated with the block of memory.

* * * * *